United States Patent Office 3,155,668
Patented Nov. 3, 1964

3,155,668
1-[(3-, 2-, AND 1-INDOLYL)-LOWER-ALKYL]-TERTIARY AMINES AND INTERMEDIATES THEREFOR
Noel F. Albertson, Castleton-on-Hudson, N.Y., assignor to Sterling Drug Inc., New York, N.Y., a corporation of Delaware
No Drawing. Filed Apr. 11, 1960, Ser. No. 21,106
23 Claims. (Cl. 260—293)

This invention relates to new 1-[(3-indolyl)-lower-alkyl]tertiary amines, 1-[(2-indolyl)-lower-alkyl]tertiary amines, 1-[(1-indolyl)-lower-alkyl]tertiary amines, their acid-addition salts and to intermediates and processes for the preparation thereof.

The present invention resides in the concept of attaching to the 1-, 2- or 3-positions of indole through an unsubstituted lower-alkylene bridge interposing from three to six carbon atoms certain 1-(azacycloalkanyl) groups or a 1 - (4-phenylazacycloheptanyl), 3-(3-azabicyclo[3.2.0] heptanyl) or 3 - (1,8,8 - trimethyl-3-azabicyclo[3.2.1] octanyl) group.

The structural embodiments of the invention are represented by the formulas

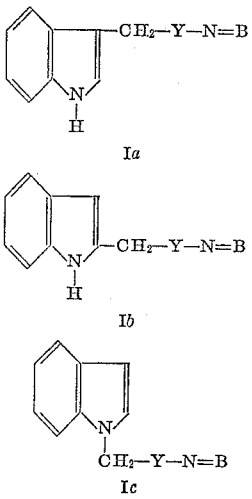

and are thus represented by the composite formula

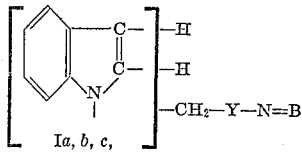

where any two of the three free valences in the 1-, 2- and 3-positions of the indole nucleus are taken up by two hydrogen atoms and the third free valence in any of the three positions is taken up by the —CH₂—Y—N=B group.

In the above general formulas Ia, b and c, Y represents lower-alkylene containing from two to seven carbon atoms and interposing from two to five carbon atoms between the indolylmethyl group and the amino nitrogen atom. The lower-alkylene group can be straight or branched and thus represents such groups, inter alia, as:

1,2-ethylene [—CH₂CH₂—]
1,3-propylene [—CH₂CH₂CH₂—]
1,2-(1-methylethylene) [—CH(CH₃)CH₂—]
1,2-(2-methylethylene) [—CH₂CH(CH₃)]
1,4-butylene [—CH₂CH₂CH₂CH₂—]
1,3-(methylpropylene) [—CH(CH₃)CH₂CH₂—]
1,2-(1-ethylethylene) [—CH(C₂H₅)CH₂—]
1,5-pentylene [—CH₂CH₂CH₂CH₂CH₂—]
1,4-(3-methylbutylene) [—CH₂CH₂CH(CH₃)CH₂—]
1,4-(2,4-dimethylbutylene) [—CH(CH₃)CH₂CH(CH₃)CH₂—], and the like.

In the above Formulas Ia, b and c, the group N=B represents 1-(azacycloalkanyl) containing from seven to nine ring atoms, 1 - (4-phenylazacycloheptanyl), 3-(3-azabicyclo[3.2.0]heptanyl) or 3(1,8,8-trimethyl-3-azabicyclo[3.2.1]octanyl). The group N=B thus represents 1-(azacycloheptanyl), 1-(azacyclooctanyl), 1-(azacyclononanyl), 1-(4-phenylazacycloheptanyl), 3-(3-azabicyclo[3.2.0]heptanyl) or 3-(1,8,8-trimethyl-3-azabicyclo[3.2.1] octanyl).

(A) PREPARATION OF THE COMPOUNDS OF FORMULA Ia

The compounds of Formula Ia are prepared by:
(1) Acylation of a secondary amine, H—N=B, with a mixed anhydride of a lower-alkyl carbonic acid and a (3-indolyl) lower-alkanoic acid and reduction of the resulting (3-indolyl)-lower-alkylcarboxamide;
(2) Reaction of an indole magnesium halide with a half lower-alkyl ester acid halide of adipic acid, saponifying the lower-alkyl epsilon - (3-indolyl)-epsilon-ketocaproate thus formed to the corresponding epsilon-(3-indolyl)-epsilon-ketocaproic acid, conversion of the latter via a lower-alkyl carbonic acid mixed anhydride to the corresponding ketocaproamide, and reduction of the latter with an alkali metal aluminum hydride to give the compounds of Formula Ia where Y is lower-alkylene interposing five carbon atoms between the indolylmethyl group and the nitrogen atom of the group N=B; and
(3) Reaction of a (3 - indolyl)-lower-alkyl primary amine with cis 1,2-cyclobutane dicarboxylic acid anhydride or d,l-camphoric acid anhydride and reduction of the resulting 3 - [(3-indolyl)-lower-alkyl]-3-azabicyclo [3.2.0]heptane-2,4-dione or 3-[(3-indolyl)-lower-alkyl]-1,8,8-trimethyl-3-azabicyclo[3.2.1] - octane - 2,4-dione with an alkali metal aluminum hydride to give compounds of Formula Ia where N=B represents 3-(3-azabicyclo-[3.2.0]heptanyl) or 3-(1,8,8-trimethyl-3-azabicyclo[3.2.1] octanyl).

(A) (1) PREPARATION OF THE COMPOUNDS OF FORMULA Ia VIA A (3-INDOLYL)-LOWER-ALKYLCARBOXAMIDE

The compounds of Formula Ia where Y is lower-alkylene interposing two carbon atoms between the indolylmethyl group and the nitrogen atom of the group N=B are prepared by reacting a mixed anhydride of a lower-alkyl carbonic acid and a beta-(3-indolyl)propionic acid with a tertiary amine, H—N=B, to give beta-(3indolyl)-propionamides which are then reduced to the compounds of formula Ia with an alkali metal aluminum hydride. Thus a quaternary ammonium salt of a 3-(di-lower-alkyl-aminomethyl)indole is reacted with a di-lower-alkyl malonate in an organic solvent inert under the conditions of the reaction, for example lower-alkanols, at a temperature in the range from about 20° C. to about 80° C. The resulting di-lower-alkyl 3-indolylmethylmalonate is then converted to the corresponding beta-(3-indolyl)propionic acid by alkaline saponification and decarboxylation. The operation is carried out at a temperature in the range from about 70° C. to about 100° C. and can be carried out either in aqueous solution or in solutions containing water and a water-miscible organic solvent, for example methanol and ethanol. If a malonic ester substituted on the alpha carbon atom by a lower-alkyl group is used in the initial reaction with the 3-(di-lower-alkylaminomethyl)

indole quaternary ammonium salt, the beta-(3-indolyl) propionic acids produced have a lower-alkyl group on the alpha carbon atom.

The beta-(3-indolyl)propionic acids thus produced are then reacted wtih a lower-alkyl haloformate in the presence of an acid-acceptor, for example triethylamine, at a temperature in the range from about −20° C. to about 20° C. to give the mixed anhydride of the lower-alkyl carbonic acid and the beta-(3-indolyl)propionic acid. The reaction is preferably carried out in an organic solvent inert under the conditions of the reaction, for example acetone, ether, ethylene dichloride and the like. Acetone is the preferred solvent. The purpose of the acid-acceptor is to take up the hydrogen halide which is split out during the course of the reaction. The mixed anhydrides thus formed are then reacted with a tertiary amine, H—N=B, that is an azacycloalkane containing from seven to nine ring atoms, 4-phenylazacycloheptane, 3-azabicyclo[3.2.0] heptane or 1,8,8-trimethyl-3-azabicyclo[3.2.1]octane to give the corresponding beta-(3-indolyl)propionamides of Formula IIa

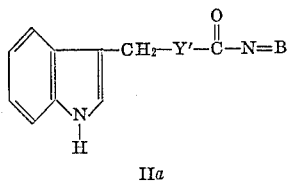

IIa where Y′ represents methylene or lower-alkylmethylene and N=B has the meaning given above. The latter are converted to the 1-[3-(3-indolyl)propyl]-tertiary amines of Formula Ia where Y is ethyl or 2-lower-alkylethyl by a procedure which will be hereinafter described.

The compounds of Formula Ia where Y is lower-alkylene interposing four carbon atoms between the indolylmethyl group and the nitrogen atom of the group N=B are prepared by reacting a mixed anhydride of a loweralkyl carbonic acid and a delta-(3-indolyl)valeric acid with a tertiary amine, H—N=B, to give delta-(3-indolyl) valeric acid amides of Formula IIa which are then reduced to the compounds of Formula Ia with an alkali metal aluminum hydride. The delta-(3-indolyl)valeric acids required as intermediates are prepared by reacting a 3-(3-indolyl)propyl halide with a di-lower-alkyl malonate and saponifying and decarboxylating the di-loweralkyl-3(3-indolyl)propylmalonate thereby produced using the same conditions as described above in the preparation of the beta-(3-indolyl)propionic acids. Thus a beta-(3-indolyl)propionic acid is reduced with an alkali metal aluminum hydride to give the corresponding 3-(3-indolyl) propanols. The reduction is carried out in an organic solvent inert under the conditions of the reaction, for example diethyl ether or tetrahydrofuran, at a temperature in the range from about 0° C. to about 65° C. The resulting 3-(3-indolyl)propanols, on reaction with a p-toluenesulfonyl halide, for example p-toluenesulfonyl chloride, in the presence of an acid-acceptor, for example pyridine, at a temperature in the range from about −10° C. to about 15° C., give the corresponding 3-(3-indolyl)propyl halides. Alternatively, the 3-(3-indolyl)propyl halides can be prepared by reacting the 3-(3-indolyl)propanols with a phosphorous trihalide or a thionyl halide.

The 3-(3-indolyl)propyl halides thus prepared, on reaction with a di-lower-alkyl malonate in the presence of an acid-acceptor, for example alkali metal alkoxides, give di-lower-alkyl 3-(3-indolyl)propylmalonates. The malonic ester used can be substituted on the alpha carbon atom with a lower-alkyl group as before to give further branching in the lower-alkylene group. The delta-(3-indolyl) valeric acids thus produced can then be converted to the delta-(3-indolyl)valeric acid amides (Formula IIa, where Y′ represents propylene or lower-alkylpropylene and N=B has the meaning given above) through the intermediate mixed anhydride of a lower-alkyl carbonic acid and the delta-(3-indolyl)valeric acid. The amides thus produced are then converted to the 1-[5-(3-indolyl)pentyl]tertiary amines of Formula Ia where Y is pentyl, 2-loweralkylpentyl, 4-lower-alkylpentyl or 2,4-di-lower-alkylpentyl by a procedure which will be hereinafter described.

The compounds of Formula Ia where Y is lower-alkylene interposing three carbon atoms between the indolylmethyl group and the nitrogen atom of the group N=B are prepared by reacting a mixed anhydride of a loweralkyl carbonic acid and a gamma-(3-indolyl)butyric acid with a tertiary amine, H—N=B, to give gamma-(3-indolyl)butyric acid amides which are then reduced to the compounds of Formula Ia with an alkali metal aluminum hydride. The gamma-(3-indolyl)butyric acids required as intermediates are prepared by reacting a 2-(3-indolyl) ethyl halide with a di-lower-alkyl malonate and saponifying and decarboxylating the di-lower-alkyl 2-(3-indolyl) ethylmalonate thereby produced using the same conditions as described above in the preparation of the beta-(3-indolyl)propionic acids. Thus a quaternary ammonium salt of a 3-(di-lower-alkylaminomethyl)indole is reacted with an alkali metal cyanide, for example sodium cyanide, at a temperature in the range from the about 20° C. to about 70° C., in an organic solvent inert under the conditions of the reaction, for example methanol or ethanol, and the resulting 3-cyanomethylindole, without isolation, is hydrolyzed with aqueous mineral acid, for example sulfuric acid or hydrochloric acid, at a temperature in the range from about 50° C. to about 100° C., to give the corresponding 3-indoleacetic acid.

Using the same conditions as described above for the preparation of delta-(3-indolyl)valeric acids from beta- (3-indolyl)propionic acids, the 3-indoleacetic acid is then reduced with an alkali metal aluminum hydride to give 2- (3-indolyl)ethanol which on reaction with a phosphorous trihalide or a thionyl halide gives the corresponding 2- (3-indolyl)ethyl halides. The latter on reaction with a di-lower-alkyl malonate in the presence of an acid-acceptor, give di-lower-alkyl 2-(3-indolyl)ethylmalonates which can then be saponified and decarboxylated to give gamma-(3-indolyl)butyric acids. By using a malonic ester having a lower-alkyl group on the alpha carbon atom, gamma-(3-indolyl)butyric acids can be produced having a lower-alkyl group on the alpha carbon atom. The latter are then converted as before to gamma-(3-indolyl)butyric acid amides (Formula IIa where Y′ is ethylene or lower-alkylethylene) by reaction of the intermediate mixed anhydride of a lower-alkylcarbonic acid and the gamma-(3-indolyl)butyric acid with an azacycloalkane, 4 - phenylazacycloheptane, 3 - azabicyclo[3.2.0] heptane or 1,8,8-trimethyl-3-azabicyclo[3.2.1]octane.

The compounds of Formula Ia where Y is lower-alkylene interposing five carbon atoms between the indolylmethyl group and the nitrogen atom of the group N=B are prepared by reacting a mixed anhydride of a loweralkyl carbonic acid and an epsilon-(3-indolyl)caproic acid with a tertiary amine using the same conditions as described above in the preparation of the beta-(3-indolyl) propionamides from the beta-(3-indolyl)propionic acids and reduction of the resulting epsilon-(3-indolyl)caproic acid amides with an alkali metal aluminum hydride. The epsilon-(3-indolyl)-caproic acids required as intermediates are prepared by reacting a 4-(3-indolyl)butyl halide with a di-lower-alkyl malonate and saponifying and decarboxylating the di-lower-alkyl 4 - (3 - indolyl)butylmalonate thereby produced using the same conditions as described above in the preparation of the beta-(3-indolyl)propionic acids. The 4-(3-indolyl)butyl halides in turn are prepared by reducing a gamma-(3-indolyl)butyric acid with an alkali metal aluminum hydride and reacting the resulting 4-(3-indolyl)butanol with a phosphorous trihalide or a thionyl halide using the same conditions as described above in the preparation of 3-(3-indolyl)propyl halides from beta-(3-indolyl)propionic acids.

The (3-indolyl)-lower-alkylcarboxamides of Formula IIa prepared as described above are then converted to the compounds of Formula Ia by reduction with an alkali metal aluminum hydride according to the following reaction:

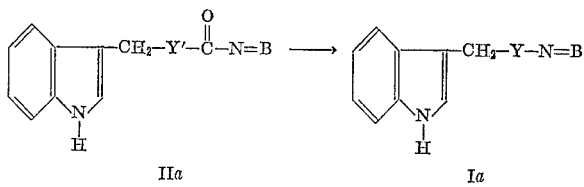

where Y and N=B have the meanings given above and Y' represents lower-alkylene having from two to six carbon atoms and interposing from one to four carbon atoms between the indolylmethyl group and the amide carbonyl carbon atom. The reaction is carried out at a temperature in the range from about 0° C. to about 65° C. in an organic solvent inert under the conditions of the reaction, for example ether or tetrahydrofuran. It is preferred to use lithium aluminum hydride.

(A)(2) PREPARATION OF THE COMPOUNDS OF FORMULA Ia BY REDUCTION OF A EPSILON-(3-INDOLYL)-EPSILON-KETOCAPROAMIDE

Alternatively the compounds of Formula Ia where Y is lower-alkylene interposing five carbon atoms between the indolylmethyl group can be prepared via epsilon-(3-indolyl)-epsilon-ketocaproic acid. The latter is prepared by reacting an indole magnesium halide, prepared from indole and a lower-alkyl magnesium halide, with a half lower-alkyl ester acid chloride of adipic acid and saponifying the lower-alkyl epsilon-(3-indolyl)-epsilon-ketoadipic ester formed in the reaction. The reaction is carried out at a temperature in the range from about −20° C. to about 20° C. in an organic solvent inert under the conditions of the reaction, for example ether or tetrahydrofuran.

The lower-alkyl epsilon-(3-indolyl)-epsilon-keto-adipic ester is saponified in aqueous alkali at a temperature in the range from about 50° C. to about 100° C. and the resulting epsilon-(3-indolyl)-epsilon-ketoadipic acid is then converted through a mixed anhydride of a lower-alkyl carbonic acid and the epsilon-(3-indolyl)-epsilon-ketoadipic acid to the epsilon-(3-indolyl)-epsilon-ketoadipic acid amides by reaction of the mixed anhydride with an azacycloalkane, 4-phenylazacycloheptane, 3-azabicyclo[3.2.0]heptane or 1,8,8-trimethyl-3-azabicyclo[3.2.1]octane.

The keto-amides of Formula IIIa thus formed are then reduced to the compounds of Formula Ia with an alkali metal aluminum hydride using the same conditions as described above for the reduction of the (3-indolyl)-lower-alkylcarboxamides of Formula IIa to the compounds of Formula Ia. The reaction is represented by the following equation where Y, Y' and N=B have the meanings given above.

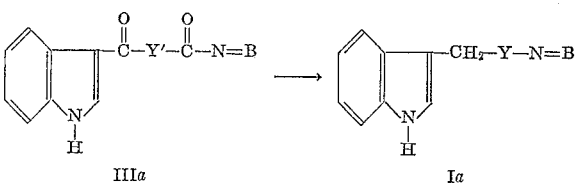

(A)(3) PREPARATION OF THE COMPOUNDS OF FORMULA Ia BY REDUCTION OF AN N-[(3-INDOLYL)-LOWER-ALKYL]IMIDE

Alternatively the compounds of Formula Ia where N=B is 3-(3-azabicyclo[3.2.0]heptanyl) or 3-(1,8,8-trimethyl-3-azabicyclo[3.2.1]octanyl) are prepared by reacting a 1-[(3-indolyl)-lower-alkyl] primary amine with cis 1,2-cyclobutane dicarboxylic acid anhydride or d,l-camphoric acid anhydride, respectively and reducing the respective 3-[(3-indolyl)-lower-alkyl]-3-azabicyclo[3.2.0]-heptane-2,4-diones and 3-[(3-indolyl)-lower-alkyl]-1,8,8-trimethyl-3-azabicyclo[3.2.1]octane-2,4-diones produced with an alkali metal aluminum hydride. The reactions are represented by the equations

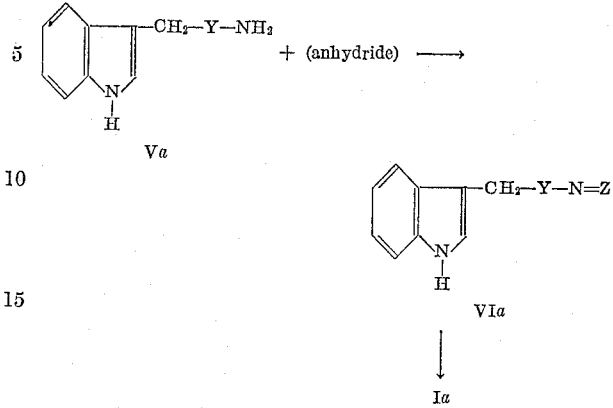

where (anhydride) represents cis 1,2-cyclobutane dicarboxylic acid anhydride or d,l-camphoric acid anhydride, N=Z represents the 3-(3-azabicyclo[3.2.0]heptane-2,4-dionyl) or 3-(1,8,8-trimethyl-3-azabicyclo[3.2.1]octane-2,4-dionyl) group, and Y has the meaning given above.

The reaction of the 1-[(3-indolyl)-lower-alkyl]primary amines of Formula Va with cis 1,2-cyclobutane dicarboxylic acid anhydride and d,l-camphoric acid anhydride is carried out either with or without the use of a solvent at a temperature in the range from about 80° C. to about 150° C. The reaction is preferably carried out without the use of a solvent.

The reduction of the 3-[(3-indolyl)-lower-alkyl]-3-azabicyclo[3.2.0]heptane-2,4-diones and the 3-[(3-indolyl)-lower-alkyl]-1,8,8-trimethyl-3-azabicyclo[3.2.1]-octane-2,4-diones of Formula VIa is carried out in an organic solvent inert under the conditions of the reaction, for example diethyl ether or tetrahydrofuran, at a temperature in the range from about 0° C. to about 65° C.

The intermediate 1-[(3-indolyl)-lower-alkyl] primary amines of Formula Va where Y is lower-alkylene interposing two carbon atoms between the indolylmethyl group and the nitrogen atom of the amino group are prepared by reducing a beta-(3-indolyl)-propionitrile with hydrogen over an appropriate catalyst, for example Raney nickel, or, alternatively, with an alkali metal aluminum hydride, for example lithium aluminum hydride, in an organic solvent inert under the conditions of the reaction, for example diethyl ether or tetrahydrofuran, at a temperature in the range from about 0° C. to about 65° C.

The 1-[(3-indolyl)-lower-alkyl] primary amines of Formula Va where Y is lower-alkylene interposing from three to five carbon atoms between the indolylmethyl group and the nitrogen atom of the amino group are prepared by reaction of an alkali metal cyanide, for example sodium cyanide, with a 3-(3-indolyl)-propyl halide, a 4-(3-indolyl)butyl halide or a 5-(3-indolyl)pentyl halide and reduction of the respective gamma-(3-indolyl)butyronitrile, delta-(3-indolyl)valeronitrile or epsilon-(3-indolyl)-capronitrile formed with hydrogen over an appropriate catalyst, for example Raney nickel or, alternatively with an alkali metal aluminum hydride, for example lithium aluminum hydride, using the same conditions described previously for the reduction of beta-(3-indolyl)-propionitriles. There is thus produced, respectively, a 4-(3-indolyl)butylamine, a 5-(3-indolyl)pentylamine or a 6-(3-indolyl)hexylamine having, respectively, three, four and five carbon atoms interposing the indolylmethyl group and the amine nitrogen atom.

The reaction between an alkali metal cyanide and a (3-indolyl)-lower-alkyl halide takes place in an organic solvent inert under the conditions of the reaction, for example methanol, ethanol, acetone, and the like, at a temperature in the range from about 50° C. to about 80° C. and perhaps using a catalytic amount of an alkali metal iodide to facilitate the reaction.

The (3-indolyl)-lower-alkyl halides are prepared by the method described above, that is a di-lower-alkyl (3-indolyl)-lower-alkylmalonate is saponified and decarboxylated and the resulting (3-indolyl)-lower-alkanoic acid reduced to a (3-indolyl)-lower-alkanol with an alkali metal aluminum hydride. The lower-alkanols are then converted to the corresponding (3-indolyl)-lower-alkyl halides by reacting the former with a phosphorous trihalide or a thionyl halide.

Alternatively the amines of Formula V$a$ where Y is lower-alkylene interposing two carbon atoms between the indolylmethyl group and the amine nitrogen atom can be prepared by reacting indole with a lower-alkyl vinyl ketone in the presence of an acid to give a beta-(3-indolyl)ethyl lower-alkyl ketone. The latter is then converted to its oxime by reaction with hydroxylamine in the presence of an acid-catalyst and the oxime thus produced is reduced either with hydrogen over an appropriate catalyst, for example palladium-on-charcoal, or with an alkali metal aluminum hydride to give a 3-(3-indolyl)-1-lower-alkyl-lower-alkylamine.

(B) PREPARATION OF THE COMPOUNDS OF FORMULA I$b$

The compounds of Formula I$b$ are prepared by:

(1) Acylation of a secondary amine, H—N=B, with a mixed anhydride of a lower-alkyl carbonic acid and a (2-indolyl)-lower-alkanoic acid and reduction of the resulting (2-indolyl)-lower-alkylcarboxamide; and (2) Reaction of a (2-indolyl)-lower-alkyl primary amine with cis 1,2-cyclobutane dicarboxylic acid anhydride or d,l-camphoric acid anhydride and reduction of the resulting 3-[(2-indolyl)-lower - alkyl] - 3 - azabicyclo [3.2.0]heptane-2,4-dione or 3-[(2-indolyl)-lower-alkyl]-1,8,8 - trimethyl-3-azabicyclo[3.2.1]octane-2,4-dione with an alkali metal aluminum hydride to give compounds of Formula I$b$ where N=B represents 3-(3-azabicyclo [3.2.0]heptanyl) or 3-(1,8,8 - trimethyl - 3 - azabicyclo [3.2.1]octanyl).

(B) (1) PREPARATION OF THE COMPOUNDS OF FORMULA I$b$ VIA A (2-INDOLYL)-LOWER ALKYLCARBOXAMIDE

The compounds of Formula I$b$ are prepared from the (2-indolyl)-lower-alkylcarboxamides of Formula II$b$

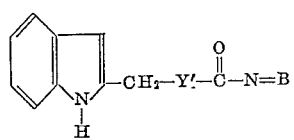

II$b$ where Y' and N=B have the meanings given above by reduction of the latter with an alkali metal aluminum hydride using the same conditions as described above in the preparation of the compounds of Formula I$a$ from the compounds of Formula II$a$.

The (2-indolyl)-lower-alkylcarboxamides are prepared in the same manner as the (3-indolyl)-lower-alklycarboxamides, that is by reaction of a mixed anhydride of a lower-alkyl carbonic acid and a (2-indolyl)-lower-alkanoic acid with a secondary amine, H—N=B, using the same conditions as described above in the preparation of the (3-indolyl)-lower-alkylcarboxamides.

The (2-indolyl)-lower-alkanoic acids required as intermediates are likewise prepared in the same manner as the (3-indolyl)-lower-alkanoic acids using the same conditions as those describe above for the preparation of the latter. That is, the beta-(2-indolyl)propionic acids are prepared by reaction of a quaternary ammonium salt of a 2-(di-lower-alkylaminomethyl)indole with a di-lower-alkyl malonate and the resulting di-lower-alkyl (2-indolyl)-methylmalonate is then saponified and decarboxylated. The gamma-(2-indolyl)butyric acids are prepared by reaction of a 2-(2-indolyl)ethyl halide with a di-lower-alkyl malonate followed by saponification and decarboxylation of the resulting di-lower-alkyl 2-(2-indolyl)ethylmalonate. The delta-(2-indolyl)valeric acids are prepared by reaction of a 3-(2-indolyl)propyl halide with a di-lower-alkyl malonate and saponification and decarboxylation of the resulting di-lower-alkyl (3-(2-indolyl) propylmalonate. The epsilon-(2-indolyl)caproic acids are prepared by reaction of a 4-(2-indolyl)butyl halide with a di-lower-alkyl malonate and saponification and decarboxylation of the resulting di-lower-alkyl 4-(2-indolyl)butylmalonate. In every case the malonic ester used can be substituted on the alpha carbon atom by a lower-alkyl group thus affording compounds of Formula I$b$ where the lower-alkylene bridge Y is branched.

The (2-indolyl)-lower-alkyl halides required as intermediates are in turn prepared by reducing an appropriate (2-indolyl)-lower-alkanoic acid with an alkali metal aluminum hydride and reacting the resulting (2-indolyl)-lower-alkanol with a phosphorous trihalide or a thionyl halide using the same conditions as described above in the preparation of the (3-indolyl)-lower-alkyl halides.

(B) (2) PREPARATION OF THE COMPOUNDS OF FORMULA I$b$ BY REDUCTION OF AN N-[(2-INDOLYL)-LOWER-ALKYL]IMIDE

The compounds of Formula I$b$ where N=B represents 3-(3-azabicyclo[3.2.0]heptanyl) or 3-(1,8,8-trimethyl-3-azabicyclo [3.2.1]octanyl) can also be prepared by reacting a 1-[(2-indolyl)-lower-alkyl] primary amine with cis 1,2-cyclobutane dicarboxylic acid anhydride or d,l-camphoric acid anhydride, respectively, and reducing the 3 - [(2-indolyl)-lower-alkyl]-3-azabicyclo[3.2.0]heptane-2,4-diones and 3-[(2 - indolyl) - lower - alkyl] - 1,8,8 - trimethyl-3 - azabicyclo[3.2.1]octane - 2,4 - diones produced with an alkali metal aluminum hydride using the same conditions as described above in the preparation of the corresponding 3-indolyl compounds. The reactions are represented by the equations:

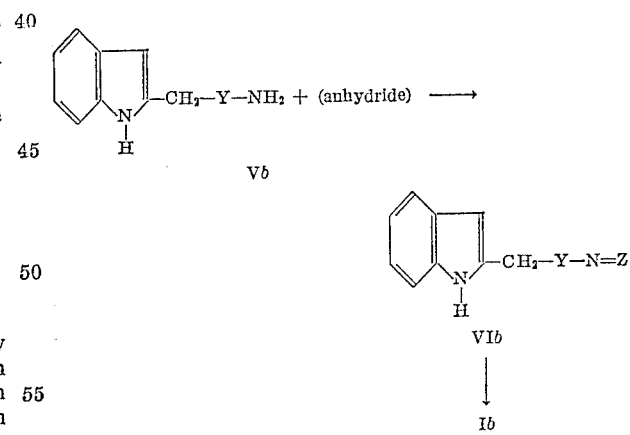

where (anhydride), Y and N=Z have the meanings given above.

The 1-[(2-indolyl)-lower-alkyl] primary amines of Formula V$b$ required as intermediates are prepared in the same manner as that described above for the preparation of the 1-[(3-indolyl)-lower-alkyl] primary amines of Formula V$a$. That is a beta-(2-indolyl)propionitrile, a gamma - (2 - indolyl)butyronitrile, a delta-(2-indolyl) valeronitrile or an epsilon-(2-indolyl)caproniitrile are reduced with an alkali metal aluminum hydride using the same conditions described above for the reduction of the beta-(3-indolyl)propionitriles to give, respectively, 3-(2-indolyl)propylamines, 4-(2-indolyl)butylamines, 5-(2-indolyl)pentylamines or 6-(2-indolyl)hexylamines.

The nitriles themselves are likewise prepared in the same manner as those of the 3-indolyl compounds, that is by reaction of a (2-indolyl)-lower-alkyl halide with an alkali metal cyanide using the conditions described above.

The (2-indolyl)-lower-alkyl halides in turn are prepared by reducing an appropriate (2-indolyl)-lower-alkanoic acid to a (2-indolyl)-lower-alkanol with an alkali metal aluminum hydride using the conditions described previously and reacting the (2-indolyl)-lower-alkanols with a phosphorous trihalide or a thionyl halide.

(C) PREPARATION OF THE COMPOUNDS OF FORMULA Ic

The compounds of Formula Ic are prepared by:

(1) Reaction of a secondary amine, H—N=B, with a mixed anhydride of a lower-alkyl carbonic acid and a beta-(1-indolyl)-propionic acid and reduction of the resulting beta-(1-indolyl)-propionamide to give compounds of Formula Ic where Y is ethylene or lower-alkyl ethylene;

(2) Reaction of indole with a halo-lower-alkyl tertiary amine; and (3) Reaction of a (1-indolyl)-lower-alkyl primary amine with cis 1,2-cyclobutane dicarboxylic acid anhydride or d,l-camphoric acid anhydride and reduction of the resulting 3 - [(1 - indolyl)-lower-alkyl]-3-azabicyclo [3.2.0] heptane-2,4-dione or 3-[(1-indolyl)-lower-alkyl]-1,8,8-trimethyl-3-azabicyclo[3.2.1]-octane-2,4-dione with an alkali metal aluminum hydride to give compounds of Formula Ic where N=B represents 3-(3-azabicyclo[3.2.0] heptanyl) or 3 - (1,8,8 - trimethyl - 3 - azabicyclo[3.2.1] octanyl).

(C) (1) PREPARATION OF THE COMPOUNDS OF FORMULA Ic VIA A BETA-(1-INDOLYL) PROPIONAMIDE

The compounds of Formula Ic where Y is lower-alkylene interposing two carbon atoms between the indolylmethyl group and the nitrogen atom of the group N=B are prepared via intermediate beta-(1-indolyl)propionic acids. The latter are prepared by reacting indole with acrylonitrile or an alpha-(lower-alkyl)-acrylonitrile in the presence of a strong base, for example, potassium hydroxide, potassium tertiary butoxide or sodamide, at a temperature in the range from about 0° C. to about 80° C. and hydrolyzing the beta-(1-indolyl)propionitrile formed in the reaction to the corresponding beta-(1-indolyl)propionic acid. A preferred base is potassium hydroxide. The hydrolysis is carried out in an aqueous solution in the presence of strong alkalies, for example potassium hydroxide or sodium hydroxide.

The resulting beta-(1-indolyl)propionic acid is then reacted with a lower-alkyl haloformate in the presence of an acid-acceptor and the mixed anhydride of the lower-alkyl carbonic acid and the beta-(1-indolyl)propionic acid thus formed is reacted with an azycycloalkane, 4-phenyl-azacycloheptane, 3-azabicyclo[3.2.0]-heptane or 1,8,8-trimethyl-3-azabicyclo[3.2.1]octane to give the beta-(1-indolyl)propionamides of Formula IIc where Y' is methylene or lower-alkylmethylene. The latter are then reduced to the compounds of Formula Ic with an alkali metal aluminum hydride using the same conditions as described above for the reduction of compounds of Formulas IIa and IIb to the compounds of Formulas Ia and Ib. The reaction is represented by the equation where Y' is methylene or lower-alkylmethylene, Y is lower-alkylene containing from two to three carbon atoms and interposing two carbon atoms between the indolylmethyl group and the nitrogen atom of the group N=B, and N=B has the meaning given above.

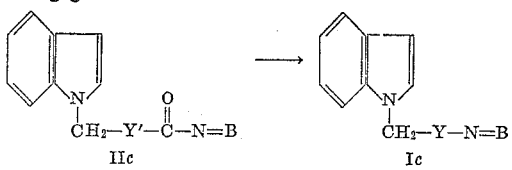

IIc → Ic (C) (2) PREPARATION OF THE COMPOUNDS OF FORMULA Ic BY REACTION OF INDOLE WITH A HALO-LOWER-ALKYL TERTIARY AMINE

The compounds of Formula Ic where Y is lower-alkylene interposing from three to five carbon atoms between the indolylmethyl group and the nitrogen atom of the group N=B are prepared by reacting indole with a halo-lower-alkyl tertiary amine in the prsence of an acid-acceptor according to the equation:

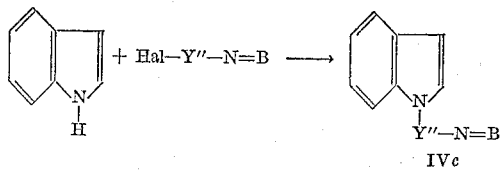

IVc where Hal represents halogen, for example chlorine, bromine and iodine, N=B has the meaning given above, and Y" represents lower-alkylene interposing from three to six carbon atoms between the halogen atom and the nitrogen atom of the group N=B. The group Y" contains a total of from three to eight carbon atoms, can be either straight or branched, and interposes from three to six carbon atoms between the indole nitrogen atom and the nitrogen atom of the group N=B. The purpose of the acid-acceptor is to take up the hydrogen halide which is split out during the course of the reaction, and includes alkali metal amides, for example sodamide, and alkali metal tertiary butoxides. It is preferred to carry out the reaction in liquid ammonia in the presence of sodamide.

(C)(3) PREPARATION OF THE COMPOUNDS OF FORMULA Ic BY REDUCTION OF AN N-[(1-INDOLYL)-LOWER-ALKYL]IMIDE

The compounds of Formula Ic where N=B represents 3-(3-azabicyclo[3.2.0]heptanyl) or 3-(1,8,8-trimethyl-3-azabicyclo[3.2.1]octanyl) can also be prepared by reacting a 1-[(1-indolyl)-lower-alkyl] primary amine with cis 1,2-cyclobutane dicarboxylic acid anhydride or d,l-camphoric acid anhydride, respectively, and reducing the 3-[(1 - indolyl)-lower-alkyl]-3-azabicyclo[3.2.0]heptane-2,4-diones and 3-[(1-indolyl)-lower-alkyl] - 1,8,8 - trimethyl - 3 - azabicyclo[3.2.1]octane-2,4-diones produced with an alkali metal aluminum hydride using the same conditions as described above in the preparation of the corresponding 3-indolyl compounds. The reactions are represented by the equations:

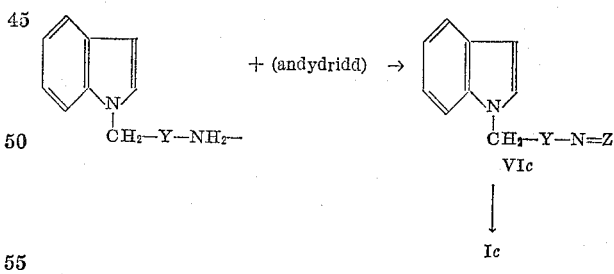

VIc
↓
Ic where (anhydride), Y and N=Z have the meanings given above.

The 1-[(1-indolyl)propyl]amines of Formula Vc where Y represents lower-alkylene interposing two carbon atoms between the indolylmethyl group and the amine nitrogen atom are prepared by reducing a beta-(1-indolyl)propionitrile with hydrogen and a catalyst, for example Raney nickel, or with an alkali metal aluminum hydride using the same conditions as described above for the preparation of the primary amines of Formula Va.

The 1-[(1-indolyl)-lower-alkyl] primary amines of Formula Vc where Y represents lower-alkylene interposing from three to five carbon atoms between the indolylmethyl group and the amine nitrogen atom are prepared by reacting an N-(4-, 5- or 6-halo-lower-alkyl)phthalimide with indole in the presence of an acid-acceptor, for example, alkali metal carbonates. The reaction is preferably carried out in an organic solvent inert under the conditions of the reaction, for example toluene or xylene, at a temperature in the range from about 70° C. to about 140° C. The resulting N-[(1-indolyl)-lower-alkyl] phthalimides are then converted to the 1-[(1-indolyl)-lower-alkyl] primary amines of Formula Vc by reacting the former with hydrazine hydrate at a temperature in the range from about 80° C. to about 150° C. in an organic solvent inert under the conditions of the reaction, for example, ethylene glycol or diethylene glycol.

The novel compounds of the instant invention are the bases of Formulas Ia, b and c and the acid-addition salts of said bases. The compounds of the invention in free base form are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates and alkali metal bicarbonates. The bases thus regenerated can then be interacted with the same or a different acid to give back the same or a different acid-addition salt. Thus the novel bases and all of their acid-addition salts are readily inter-convertible.

It will thus be appreciated that each of Formulas Ia, b and c not only represents the structural configuration of the bases of my invention but each is also representative of the respective structural entity which is common to all of my respective compounds, whether in the form of the free bases or in the form of the acid-addition salts of the bases. I have found that by virtue of this common structural entity, the bases and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as explained above, or alternatively, they can be converted to any desired pharmaceutically-acceptable acid-addition salt by double decomposition reactions involving the anion, for example, by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purification salt derivatives can if desired be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition salts of my new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new 1-[(3-, 2- and 1-indolyl)-lower-alkyl] amines and not in any particular acid moiety or acid anion associated with the salt forms of my compounds; rather, the acid moieties or anions which can be associated in the salt forms are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid as exemplified by organic mono- and polycarboxylic acids such as found, for example, in Beilstein's Organische Chemie, 4th Ed., volumes III, IV, IX, X XIV, XVII, XIX, XXI, XXII, and XXV; organic mono- and polysulfonic and -sulfinic acids such as found, for example in Beilstein volumes VI, XI, XVI, and XXII; organic phosphonic and phosphinic acids such as found, for example, in Beilstein volumes XI and XVI; organic acids of arsenic and antimony such as found, for example, in Beilstein volume XVI; organic heterocyclic carboxylic, sulfonic, and sulfinic acids such as found, for example in Beilstein volumes XVIII, XXII, and XXV; acidic ion-exchange resins, for example Amberlite® XE–66 resin; and inorganic acids of any acid forming element or combination of elements such as found in Mellor, Comprehensive Treatise on Inorganic and Theoretical Chemistry, Longman's, Green and Co., New York, N.Y., volumes I–XVI. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds such as found, for example, in volume VI of Beilstein, acidic compounds having "activated" or acidic hydrogen atoms, as for example, picrolonic acid, or barbituric acid derivatives having an acidic proton such as found, for example, in Cox et al. Medicinal Chemistry, vol. IV, John Wiley and Sons, Inc., New York, N.Y. (1959). Also comprehended as salt forming agents are so-called Lewis acids which lack a pair of electrons in the outer "electron shell" and react with basic compounds having an unshared pair of electrons to form salts, for example boron trifluoride.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphonic acid, phenylphosphinic acid, Amberlite® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluation of the compounds of Formulas Ia, b and c have shown that they possess pharmacodynamic and chemotherapeutic properties, in particular, hypotensive, sedative, local anesthetic, monoamine oxidase inhibitory and antifungal activities thus indicating their usefulness as blood pressure lowering agents, sedatives, local anesthetics, psychic energizers and anti-fungal agents. The compounds of Formulas IIa, b and c have also been shown to possess hypotensive activity and are thus useful not only as intermediates in the preparation of the compounds of Formulas Ia, b and c but also have utility as blood pressure lowering agents.

Hypotensive activity was determined in renal hypertensive rats using the photoelectric tensometer foot method described by Kersten et al., J. Lab. Clin. Med. 32, 1090, (1957). This method comprises administering the test compounds in the form of an aqueous solution of an acid-addition salt by subcutaneous injection (s.c.) and orally (p.o.) by a stomach tube into groups of three renal hypertensive rates at each of two to four different dose levels graduated at 0.3 to 0.9 log intervals. The systolic blood pressure was determined before medication as a control, and the mean systolic blood pressure in mm. Hg ± two standard errors was calculated for each group of control readings. After medication, the blood pressure was determined at intervals of 1, 2, 4, 6, 24 and 48 hours in each rat. An average depressor response in any group which fell below the limit of two standard errors from the control reading was interpreted as a significant fall, and the smallest dose producing at least one significant fall below the mean control blood pressure reading was determine for each compound. This dose, in mg./kg. is designated the Minimum Effective Hypotensive Dose (MEHD).

Sedative activity was determined in mice using the hexobarbital potentiation test by administering the compounds in the form of an aqueous solution of an acid-addition salt by sub-cutaneous injection into three groups of ten mice at each of three different dose levels. Forty minutes after medication, the animals were each administered a subhypnotic dose of 40 mg./kg. of hexobarbital given intraperitoneally. The animals in each group were then examined periodically for loss of the righting reflex and the number of animals that suffered loss of the righting reflex for at least one minute was noted. The dose which produced loss of the righting reflex in fifty percent of the animals was called the Effective Dose$_{50}$ (ED$_{50}$).

Local anesthetic activity was determined according to the method of Bulbring and Wajda [J. Pharmacol. and Exptl. Therap. 85, 78 (1945)] by injecting aqueous solutions of the acid-addition salts intradermally on the backs of guinea pigs using varying concentrations of solutions graded at 0.3 log intervals. The sensitivity of the wheals thereby produced was tested every five minutes for a period of thirty minutes by pricking the skins with a set of six pinpricks spaced at about one second intervals. The score for each wheal was obtained by the addition of the number of pinpricks which failed to elicit the reflex skin twitch at each reading. The average score for each concentration was plotted against the log of the concentration. The concentration expected to yield a score of 5, which was taken as the Threshold Activity Concentration (TAC$_5$), was estimated by extrapolation from the dose-response curves.

Anti-fungal activity was determined by standard serial dilution tests.

The toxicities of the compounds were determined by intravenous injection in mice at various dose levels, and the LD$_{50}$, the dose lethal to fifty percent of the animals at that dose level, was estimated.

The compounds can be prepared for use by dissolving under sterile conditions a salt form of the compounds in water (or an equivalent amount of a non-toxic acid if the free base in used), or in a physiologically compatible aqueous medium such as saline, and stored in ampoules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared. When used as hypotensive agents, they are formulated and used in the same manner as conventional hypotensive agents, such as reserpine preparations, and indeed can be used advantageously in combination with such hypotensive agents. When used as local anesthetics the compounds can be used as their acid-addition salts, for example hydrochlorides, in aqueous liquid preparations. These preparations can be administered topically or injected intramuscularly or intravenously. Alternatively they can be prepared for use as salves or creams for topical application by mixing with known adjuvants, for example, petroleum jelly, or they can be combined with other pharmacologically active compounds, for example vasoconstrictor agents.

The structures of the compounds of the invention are established by their mode of synthesis and corroborated by the correspondence between calculated values for the elements and values found by chemical analysis.

PREPARATION OF INTERMEDIATES

*Example 1*

*1-[beta-(3-indolyl)propionyl]azacycloheptane* [IIa; Y' is CH$_2$].—To a solution of 69 g. (3.0 moles) of sodium in 1500 ml. of absolute ethanol was added 900 ml. of diethyl malonate followed by 522 g. (3.0 moles) of gramine. To the soltuion was then added 826 g. (6.0 moles) of methyl iodide with cooling. The mixture was filtered and the filtrate concentrated in vacuo leaving diethyl 3-indolylmethylmalonate as a viscous brown oil.

The diethyl 3-indolylmethylmalonate was dissolved in 1 liter of ethanol and the solution treated with an aqueous solution of 300 g. of sodium hydroxide in 500 ml. of water. The solution became quite warm and deposited an immediate precipitate. To the mixture was added 700 ml. of water, and the resulting solution was concentrated to remove the ethanol. The resulting clear solution was cooled, acidified and extracted with ethyl acetate. The extract was concentrated in vacuo and the resulting red-brown residue dissolved in a solution containing 269 g. of sodium bicarbonate in 1200 ml. of water. The resulting solution was acidified with 150 ml. of concentrated hydrochloric acid and the resulting precipitate collected, washed and dried giving 74 g. of beta-(3-indolyl)propionic acid, M.P. 123–125° C. (uncorr.).

A solution of 18.9 g. (0.1 mole) of beta-(3-indolyl)-propionic acid in dry acetone was treated with 14 ml. of triethylamine. The resulting solution was treated in the cold with 14 ml. of isobutylchloroformate and then with a solution of 10 g. (0.1 mole) of azacycloheptane. The reaction mixture was filtered and the filtrate concentrated to dryness. The crude solid was recrystallized repeatedly from ethyl acetate giving 18.9 g. of 1-[beta-(3-indolyl)-propionyl]azacycloheptane, M.P. 115–118° C. (uncorr.).

*Analysis.*—Calcd. for C$_{17}$H$_{22}$N$_2$O: C, 75.50; H, 8.20; N, 10.36. Found: C, 75.10; H, 7.77; N, 10.17.

*Example 2*

*1-[gamma-(3-indolyl)butyryl]azacycloheptane* [IIa; Y' is CH$_2$CH$_2$].—Diethyl malonate (5.5 ml.) was added to a solution of 0.8 g. (0.35 mole) of sodium in 50 ml. of absolute ethanol. To the solution was added 7.3 g. (0.033 mole) of 2-(3-indolyl)ethyl bromide. The solution was stirred and refluxed for three hours, poured into ice water, and the resulting oil which separated was extracted into ethyl acetate. The extract was dried and concentrated giving 9.5 g. if diethyl 2-(3-indolyl)ethylmalonate as a thick oil.

The diethyl 2-(3-indolyl)ethylmalonate was dissolved in 62 ml. of ethanol and the solution treated with 62 ml. of 1 N sodium hydroxide. The mixture was warmed on a steam bath to dissolve all material and the mixture allowed to stand at room temperature for twenty-four hours. The mixture was then concentrated to dryness and the residue taken into water, washed with diethyl ether and acidified to Congo red with dilute hydrochloric acid. The mixture on cooling and removal of the dissolved ether, deposited a solid which was filtered off and dried giving 2-(3-indolyl)ethylmalonic acid.

The 2-(3-indolyl)ethylmalonic acid (4.5 g., 0.021 mole) was heated at 160° C. for ten minutes during which time bubbles of carbon dioxide were given off. The reaction mixture was cooled and the resulting solid was collected and recrystallized from an ethanol-water mixture giving 3.7 g. of gamma-(3-indolyl)butyric acid, M.P. 109–117° C. (uncorr.).

The gamma-(3-indolyl)butyric acid (3.6 g., 0.018 mole) was coupled with 1.8 g. (0.018 mole) of azacycloheptane following the manipulative procedure described above in Example 1. There was thus obtained 4.7 g. of 1-[gamma-(3-indolyl)butyryl]azacycloheptane.

*Example 3*

*1-[delta-(3-indolyl)valeryl]azacycloheptane* [IIa; Y' is (CH$_2$)$_3$].—Delta-(3-indolyl)valeric acid was prepared from 12.6 g. (0.065 mole) of 3-(3-indolyl)propyl chloride and 10 ml. of diethylmalonate following the manipulative procedure described above in Example 2. There was thus obtained 5.0 g. of delta-(3-indolyl)valeric acid which was coupled with 2.3 g. (0.023 mole) of azacycloheptane following the manipulative procedure described above in Example 1. There was thus obtained 6.9 g. of 1-[delta-(3-indolyl)valeryl]azacycloheptane.

*Example 4*

*1-[beta-(3-indolyl)propionyl]azacyclooctane* [IIa; Y' is CH$_2$] was prepared from 6.3 g. (0.033 mole) of beta-(3-indolyl)propionic acid and 5.0 g. (0.044 mole) of azacyclooctane following the manipulative procedure described above in Example 1. There was thus obtained 9.7 g. of 1-[beta-(3-indolyl)propionyl]azacyclooctane, M.P. 136–138° C. (uncorr.).

*Analysis.*—Calcd. for C$_{18}$H$_{24}$N$_2$O: N, 10.15. Found: N, 9.85.

*Example 5*

*1-[beta-(3-indolyl)propionyl]azacyclononane* [IIa; Y' is CH$_2$] was prepared from 9.5 g. of beta-(3-indolyl)propionic acid and 6.4 g. (0.05 mole) of azacyclononane following the manipulative procedure described above in Example 1. There was thus obtained 6.7 g. of 1-[beta-(3-indolyl)propionyl]azacyclononane, M.P. 158.2–161.8° C. (corr.).

*Analysis.*—Calcd. for C$_{19}$H$_{26}$N$_2$O: N, 9.39; C, 76.47; H, 8.78. Found: N, 9.14; C, 76.61; H, 8.60.

*Example 6*

*1-[beta-(3-indolyl)propionyl]-4-phenylazacycloheptane* [IIa; Y' is CH$_2$] was prepared from 8.1 g. (0.045 mole) of beta-(3-indolyl)propionic acid and 7.5 g. (0.045 mole) of 4-phenylazacycloheptane following the manipulative procedure described above in Example 1. The crude material was recrystallized from ethyl acetate giving 1-[beta-(3-indolyl)propionyl] - 4 - phenylazacycloheptane, M.P. 151.8–154.0° C. (corr.).

*Analysis.*—Calcd. for C$_{23}$H$_{26}$N$_2$O: C, 79.72; H, 7.56; N, 8.09. Found: C, 79.35; H, 7.49; N, 7.84.

*Example 7*

*3-[beta-(3-indolyl)-alpha - methylpropionyl]-3-azabicyclo[3.2.0]heptane* [IIa; Y' is CH(CH$_3$)].—By reacting gramine methiodide with diethyl alpha-methylmalonate according to the manipulative procedure described above in Example 1 and saponifying and decarboxylating the product formed according to the manipulative procedure described above in Example 2, there can be obtained beta-(3-indolyl)-alpha-methylpropionic acid. By reaction of the latter with a lower-alkyl haloformate in the presence of an acid-acceptor and subsequent reaction of the product formed with 3-azabicyclo[3.2.0]heptane according to the manipulative procedure described above in Example 1, there can be obtained 3-[beta-(3-indolyl)-alpha-methylpropionyl]-3-azabicyclo[3.2.0]heptane.

*Example 8*

*3-[gamma-(3-indolyl) - beta-methylbutyryl]-1,8,8-trimethyl-3-azabicyclo[3.2.1]octane* IIa; Y' is

By reacting 2-(3-indolyl)-1-methylethyl bromide with diethyl malonate and saponifying and decarboxylating the product thus formed according to the manipulative procedure described above in Example 2, there can be obtained gamma-(3-indolyl)-beta-methylbutyric acid. By reaction of the latter with a lower-alkyl haloformate in the presence of an acid-acceptor and subsequent reaction of the product thus formed with 1,8,8-trimethyl-3-azabicyclo[3.2.1]octane, there can be obtained 3-[gamma-(3-indolyl)-beta - methylbutyryl]-1,8,8-trimethyl-3-azabicyclo[3.2.1]octane.

*Example 9*

*1-[beta-(3 - indolyl)-alpha - ethylpropionyl]azacycloheptane* [IIa; Y' is CH(C$_2$H$_5$)].—By reaction of gramine methiodide with diethyl alpha-ethylmalonate and subsequent saponification and decarboxylation of the product produced thereby according to the manipulative procedure described above in Example 1, there can be obtained beta-(3-indolyl)-alpha-ethylpropionic acid. On reaction of the latter with a lower-alkyl haloformate in the presence of an acid-acceptor and subsequent reaction of the product thus formed with azacycloheptane, there can be obtained 1-[beta-(3-indolyl)-alpha-ethylpropionyl]azacycloheptane.

*Example 10*

*1 - [delta - (3-indolyl)-alpha-methylvaleryl]azacycloheptane* [IIa; Y' is CH$_2$CH$_2$CH(CH$_3$)].—By reaction of a 3-(3-indolyl) propyl halide with diethyl alpha-methylmalonate and subsequent saponification and decarboxylation of the product produced thereby according to the manipulative procedure described above in Example 2, there can be obtained delta-(3-indolyl)-alpha-methylvaleric acid. By reaction of the latter with a lower-alkyl haloformate in the presence of an acid-acceptor and subsequent reaction of the product produced thereby with azacycloheptane, there can be obtained 1-[delta-(3-indolyl)-alpha-methylvaleryl]azacycloheptane.

*Example 11*

*1 - [delta - (3 - indolyl) -alpha, gamma - dimethyl - valeryl]azacycloheptane* [IIa; Y' is

By reduction of the beta-(3-indolyl)-alpha-methylpropionic acid obtained above in Example 7 with an alkali metal aluminum hydride in an organic solvent inert under the reaction conditions, for example diethyl ether, there can be obtained 3-(3-indolyl)-2-methlpropanol. By reaction of the latter with a phosphorous trihalide, there can be obtained a 3-(3-indolyl)-2-methylpropyl halide. On reaction of the latter with diethyl alpha-methylmalonate and saponification and decarboxylation of the product produced thereby according to the manipulative procedure described above in Example 2, there can be obtained delta - (3 - indolyl)-alpha,gamma-dimethylvaleric acid. By reaction of the latter with a lower-alkyl haloformate in the presence of an acid-acceptor and subsequent reaction of the compound produced thereby with azacycloheptane according to the manipulative procedure described above in Example 1, there can be obtained 1 - [delta-(3-indolyl)-alpha,gamma-dimethylvaleryl]azacycloheptane.

Example 12

1 - [epsilon-(3-indolyl)-epsilon-ketocaproyl]azacycloheptane [IIIa; Y is $(CH_2)_4$].—Magnesium turnings (2.4 g., 0.1 mole) in 35 ml. of dry ether were treated with a solution containing 14.2 g. 0.1 mole) of methyl iodide in 450 ml. of dry ether. The solution was stirrred for ten minutes, and when formation of the methyl magnesium iodide was complete, a solution containing 11.7 g. (0.1 mole) of indole in 60 ml. of dry ether was added. The mixture was stirred an additional thirty minutes and then treated with a solution containing 19.3 g. (0.1 mole) of ethyl adipate acid chloride in 70 ml. of dry ether. The mixture was stirred at room temperature for four hours, acidified with dilute acetic acid, filtered and the ether layer separated from the filtrate. The ether layer was taken to dryness, the residue triturated with ether and the resulting solid collected. The solid material was recrystallized from ethanol giving 3.5 g. of ethyl epsilon-(3-indolyl)-epsilon-ketocaproate, M.P. 107–112° C. (uncorr.).

The ethyl epsilon-(3-indolyl)-epsilon-ketocaproate was dissolved in 15 ml. of ethanol and 13 ml. of 1 N sodium hydroxide. The reaction mixture was allowed to stand at room temperature for one hour, extracted with ether and the aqueous solution acidified with dilute hydrochloric acid. The resulting solid was collected and dried giving 2.4 g. of epsilon-(3-indolyl)-epsilon-ketocaproic acid, M.P. 195–197° C. (uncorr.).

*Analysis.*—Calcd. for $C_{14}H_{15}NO_3$: N, 5.71. Found: N, 5.77.

The epsilon-(3-indolyl)-epsilon-ketocaproic acid was coupled with azacycloheptane via the mixed anhydride following the manipulative procedure described above in Example 1. There was thus obtained 1.5 g. of 1-[epsilon-(3-indolyl)-epsilon-ketocaproyl]-azacycloheptane, M.P. 158-159° C. (uncorr.).

Example 13

1-[beta-(2-indolyl)propionyl]azacycloheptane [IIb; Y' is $CH_2$].—By reacting a 2-(dialkylaminomethyl)indole methohalide with diethyl malonate and subsequent saponification and decarboxylation of the product produced thereby according to the manipulative procedure described above in Example 1, there can be obtained beta-(2-indolyl)propionic acid. By reaction of the latter with a lower-alkyl haloformate in the presence of an acid-acceptor and subsequent reaction of the product produced thereby with azacycloheptane, there can be obtained 1-[beta-(2-indolyl)propionyl]azacycloheptane.

Example 14

1-[gamma-(2-indolyl)butyryl]azacyclooctane [IIb; Y' is $CH_2CH_2$].—By reaction of a 2-(dialkylaminomethyl)indole methohalide with an alkali metal cyanide in an organic solvent inert under the conditions of the reaction, for example ethanol, there can be obtained 2-(cyanomethyl)indole. By heating the latter with aqueous alkali, for example potassium hydroxide, there can be obtained 2-indole acetic acid. By reduction of the latter with an alkali metal aluminum hydride in an organic solvent inert under the conditions of the reaction, for example diethyl ether, there can be obtained 2-(2-indolyl)ethanol. By reaction of the latter with a phosphorous trihalide, there can be obtained a 2-(2-indolyl)-ethyl halide. By reaction of the latter with diethylmalonate and subsequent saponification and decarboxylation of the product produced thereby according to the manipulative procedure described above in Example 2, there can be obtained gamma-(2-indolyl)butyric acid. By reaction of the latter with a lower-alkyl haloformate in the presence of an acid-acceptor and subsequent reaction of the product produced thereby with azacyclooctane, there can be obtained 1-[gamma-(2-indolyl)butyryl]azacyclooctane.

Example 15

1-[delta-(2-indolyl)valeryl]azacyclononane [IIb; Y' is $(CH_2)_3$].—By reduction of the beta-(2-indolyl)propionic acid obtained above in Example 13 with an alkali metal aluminum hydride in an organic solvent inert under the conditions of the reaction, for example diethyl ether, there can be obtained 3-(2-indolyl)propanol. By reaction of the latter with a phosphorous trihalide, there can be obtained a 3-(2-indolyl)propyl halide. By reaction of the latter with diethyl malonate and subsequent saponification and decarboxylation of the product produced thereby according to the manipulative procedure described above in Example 2, there can be obtained gamma-(2-indolyl)valeric acid. By reaction of the latter with a lower-alkyl haloformate in the presence of an acid-acceptor and subsequent reaction of the product produced thereby with azacyclononane according to the manipulative procedure described above in Example 1, there can be obtained 1-[delta-(2-indolyl)valeryl]azacyclononane.

Example 16

1-[beta-(2-indolyl)-alpha-methylpropionyl]-4-phenylazacycloheptane [IIb; Y' is $CH(CH_3)$].—By reaction of a 2-(dialkylaminomethyl)indole methohalide with diethyl alpha-methylmalonate and subsequent saponification and decarboxylation of the product produced thereby according to the manipulative procedure described above in Example 1, there can be obtained beta-(2-indolyl)-alpha-methylpropionic acid. By reaction of the latter with a lower-alkyl haloformate in the presence of an acid-acceptor and subsequent reaction of the product produced thereby with 4-phenylazacycloheptane, there can be obtained 1-[beta-(2-indolyl)-alpha-methylpropionyl]-4-phenylazacycloheptane.

Example 17

3-[gamma-(2-indolyl)-beta-methylbutyryl]-3-azabicyclo[3.2.0]heptane [IIb; Y' is $CH(CH_3)CH_2$].—By reaction of a 2-(2-indolyl)-1-methylethyl halide with ethyl cyanoacetate and subsequent saponification and decarboxylation of the product produced thereby according to the manipulative procedure described above in Example 2, there can be obtained gamma-(2-indolyl)-beta-methylbutyric acid. By reaction of the latter with a lower-alkyl haloformate in the presence of an acid-acceptor and subsequent reaction of the product produced thereby with 3-azabicyclo[3.2.0]heptane according to the manipulative procedure described above in Example 1, there can be obtained 3-[gamma-(2-indolyl)-beta-methylbutyryl]-3-azabicyclo[3.2.0]heptane.

Example 18

3 - [beta - (2 - indolyl) - alpha - ethylpropionyl]-1,8,8 - trimethyl - 3 - azabicyclo[3.2.1]octane [IIb; Y' is $CH(C_2H_5)$].—By reaction of a 2-dialkylaminomethyl)indole methohalide with diethyl alpha-ethylmalonate and subsequent saponification and decarboxylation of the product produced thereby according to the manipulative procedure described above in Example 1, there can be obtained beta-(2-indolyl)-alpha-ethylpropionic acid. By reaction of the latter with a lower-alkyl haloformate in the presence of an acid-acceptor and subsequent reaction of the product produced thereby with 1,8,8-trimethyl-3-azabicyclo[3.2.1]octane according to the manipulative procedure described above in Example 1, there can be obtained 3-[beta-(2-indolyl)-alpha-ethylpropionyl]-1,8,8-trimethyl - 3 - azabicyclo[3.2.1]octane.

Example 19

1-[delta-(2 - indolyl) - alpha - methylvaleryl]azacycloheptane [IIb; Y' is $CH_2CH_2CH(CH_3)$].—By reduction of the beta-(2-indolyl)propionic acid produced above in Example 13 with an alkali metal aluminum hydride in an organic solvent inert under the conditions of the reaction, for example diethyl ether, there can be obtained 3-(2-indolyl)propanol. By reaction of the latter with a phosphorous trihalide there can be obtained a 3-(2-indolyl)propyl halide. By reaction of the latter with diethyl alpha-ethylmalonate and subsequent saponification and decarboxylation of the product produced thereby according to the manipulative procedure described above in Example 2, there can be obtained gamma-(2-indolyl)-alpha-methylvaleric acid. By reaction of the latter with a lower-alkyl haloformate in the presence of an acid-acceptor and subsequent reaction of the product produced thereby with azacycloheptane according to the manipulative procedure described above in Example 1, there can be obtained 1-[delta-(2-indolyl)-alpha-methylvaleryl]azacycloheptane.

*Example 20*

1-[delta-(2 - indolyl) - alpha,gamma-dimethylvaleryl]azacycloheptane [IIb; Y' is CH(CH$_3$)CH$_2$CH(CH$_3$)].—By reduction of the beta-(2-indolyl)-alpha-methylpropionic acid obtained above in Example 16 with an alkali metal aluminum hydride in an organic solvent inert under the conditions of the reaction, there can be obtained 3-(2-indolyl)-2-methylpropanol. By reaction of the latter with a phosphorous trihalide, there can be obtained a 3-2-indolyl)-2-methylpropyl halide. By reaction of the latter with diethyl alpha-methylmalonate and subsequent saponification and decarboxylation of the product produced thereby according to the manipulative procedure described above in Example 2, there can be obtained delta-(2-indolyl)-alpha,gamma-dimethylvaleric acid. By reaction of the latter with a lower-alkyl haloformate in the presence of an acid-acceptor and subsequent reaction of the product produced thereby with azacycloheptane according to the manipulative procedure described above in Example 1, there can be obtained 1-[delta-(2-indolyl)-alpha,gamma-dimethylvaleryl]azacycloheptane.

*Example 21*

1-[beta - (1 - indolyl)propionyl]azacycloheptane [IIc; Y' is CH$_2$].—To a suspension of 1.0 g. of powdered potassium hydroxide in a solution containing 128.9 g. (1.1 mole) of indole in 225 ml. of benzene, there was added dropwise with stirring 78 ml. of acrylonitrile. The reaction mixture was stirred for two hours at room temperature, washed with water and the organic layer dried and concentrated in vacuo giving 186.7 g. of beta-(1-indolyl)propionitrile. The crude material was distilled at 0.1 mm. Hg and the fraction boiling at 140°–146° C. was collected as product. There was thus obtained 135 g. of beta-(1-indolyl)propionitrile.

The latter was dissolved in 300 ml. of ethanol, a solution of 48 g. of sodium hydroxide in 300 ml. of water was added, and the mixture heated under reflux for six hours. The ethanol was removed in vacuo, ice water was added to the concentrate, and the solution was acidified with dilute hydrochloric acid. The resulting precipitate was collected, washed with water and dried giving 152 g. of beta-(1-indolyl)propionic acid, M.P. 79–87° C. (uncorr.).

Beta-(1-indolyl)propionic acid (18.9 g., 0.1 mole) was reacted with 14 ml. of isobutylchloroformate in the presence of 14 ml. of triethylamine, and the resulting mixed anhydride reacted with 10 g. (0.1 mole) of azacycloheptane following the manipulative procedure described above in Example 1. There was thus obtained 24.0 g. of 1-[beta-(1-indolyl)propionyl]azacycloheptane as a reddish oil.

*Example 22*

1-[beta-(1-indolyl)propionyl]azacyclooctane [IIc; Y' is CH$_2$] was prepared from 9.5 g. (0.05 mole) of beta-(1-indolyl)propionic acid and 5.6 g. (0.05 mole) of azacyclooctane by way of the isobutyl carbonic mixed anhydride following the manipulative procedure described above in Example 1. There was thus obtained 12.2 g. of 1-[beta-(1-indolyl)propionyl]azacyclooctane as a light oil.

*Example 23*

1-[beta-(1-indolyl)propionyl]azacyclononane [IIc; Y' is CH$_2$] was prepared from 9.5 g. (0.05 mole) of beta-(1-indolyl)propionic acid and 6.4 g. (0.05 mole) of azacyclononane by way of the isobutyl carbonic mixed anhydride following the manipulative procedure described above in Example 1. The product was recrystallized from ethanol giving 12.5 g. of 1-[beta-(1-indolyl)propionyl]azacyclononane, M.P. 68.2–70.8° C. (corr.).

*Analysis.*—Calcd. for C$_{19}$H$_{26}$N$_2$O: C, 76.47; H, 8.78; N, 9.39. Found: C, 76.71; H, 8.94; N, 9.31.

The minimum effective hypotensive dose of 1-[beta-(1-indolyl)propionyl]azacyclononane given subcutaneously in the renal hypertensive rat was found to be 0.10 mg./kg.

*Example 24*

1-[beta-(1-indolyl)propionyl] - 4 - phenylazacycloheptane [IIc; Y' is CH$_2$] was prepared from 8.1 g. (0.04 mole) of beta-(1-indolyl)-propionic acid and 7.5 g. (0.04 mole) of 4-phenylazacycloheptane by way of the intermediate isobutyl carbonic mixed anhydride following the manipulative procedure described above in Example 1. There was thus obtained 7.4 g. of 1-[beta-(1-indolyl)-propionyl]-4-phenylazacycloheptane.

*Example 25*

3-[3-(3-indolyl) - 1-methylpropyl]-3-azabicyclo[3.2.0]-heptane-2,4-dione [VIa; Y is CH$_2$CH(CH$_3$)].—A solution of 46.8 g. (0.40 mole) of indole in 240 ml. of glacial acetic acid and 80 ml. of acetic anhydride was treated with 84 g. (0.83 mole) of methyl vinyl ketone. The solution was stirred for about ten minutes at room temperature and then on a steam bath for about forty minutes and then poured into crushed ice and water. The yellow solid that separated was collected, dried and recrystallized from a benzene-hexane mixture giving 62.7 g. of beta-(3-indolyl)ethyl methyl ketone.

The beta-(3-indolyl)ethyl methyl ketone (30.9 g., 0.16 mole) was dissolved in 310 ml. of ethanol and the solution treated with 62 g. of hydroxylamine hydrochloride and 93 g. of sodium acetate dissolved in 310 ml. of water. The resulting solution was refluxed for fifteen minutes, cooled and poured into cold water. There was thus obtained beta-(3-indolyl)ethyl methyl ketone oxime as a dark oil.

The latter, dissolved in absolute ether, was reduced with lithium aluminum hydride in ether and the product isolated from an alkaline aqueous mixture. The crude product was distilled in vacuo giving 13.1 g. of 3-(3-indolyl)-1-methylpropylamine, B.P. 159–163° C./1.6 mm.

The 3-(3-indolyl)-1-methylpropylamine (4.2 g., 0.022 mole) was heated with 6.3 g. (0.05 mole) of cis 1,2-cyclobutane dicarboxylic anhydride at 150–160° C. for three hours. 3-[3-(3-indolyl) - 1-methylpropyl]-3-azabicyclo[3.2.0]heptane-2,4-dione was isolated and used as such without further purification.

*Example 26*

3-[6-(3-indolyl)hexyl] - 1,8,8 - trimethyl-3-azabicyclo-[3.2.1]octane-2,4-dione [VIa; Y is (CH$_2$)$_5$].—By reacting 5-(3-indolyl)pentyl bromide with an alkali metal cyanide, for example sodium cyanide, in an organic solvent inert under the conditions of the reaction, for example ethanol, there can be obtained epsilon-(3-indolyl)-capronitrile. By reduction of the latter with hydrogen over a catalyst, for example Raney nickel, there can be obtained 6-(3-indolyl)hexylamine. By reaction of the latter with camphoric anhydride according to the manipulative procedure described above in Example 25, there can be obtained 3-[6-(3-indolyl)hexyl]-1,8,8-trimethyl-3-azabicyclo[3.2.1]octane-2,4-dione.

*Example 27*

3-[3-(2-indolyl)-2-methylpropyl] - 3-azabicyclo[3.2.0]-heptane-2,4-dione [VIb; Y is CH(CH$_3$)CH$_2$].—By reacting a 2-(2-indolyl)-1-methylethyl halide with an alkali metal cyanide, for example sodium cyanide, in an organic solvent inert under the conditions of the reaction, for example ethanol, there can be obtained beta-(2-indolyl) - alpha - methylpropionitrile. By reducing the latter with hydrogen over a catalyst, for example Raney nickel, there can be obtained 3-(2-indolyl)-2-methylpropylamine. By reacting the latter with cis 1,2-cyclobutanedicarboxylic anhydride according to the manipulative procedure described above in Example 25, there can be obtained 3-[3-(2-indolyl)-2-methylpropyl] - 3-azabicyclo[3.2.0]heptane-2,4-dione.

*Example 28*

3-[6-(2-indolyl)hexyl] - 1,8,8 - trimethyl-3-azabicyclo-[3.2.1]octane-2,4-dione [VIb; Y is $(CH_2)_5$].—By reacting a 5-(2-indolyl)pentyl halide with an alkali metal cyanide, for example sodium cyanide, in an organic solvent inert under the conditions of the reaction, for example ethanol, there can be obtained epsilon-(2-indolyl)capronitrile. By reducing the latter with hydrogen over a catalyst, for example Raney nickel, there can be obtained 6-(2-indolyl)hexylamine. By reacting the latter with camphoric anhydride according to the manipulative procedure described above in Example 25, there can be obtained 3-[6-(2-indolyl)hexyl] - 1,8,8-trimethyl-3-azabicyclo[3.2.1]octane-2,4-dione.

*Example 29*

3 - [3 - (1-indolyl)propyl]-3-azabicyclo[3.2.0]heptane-2,4-dione [VIc; Y is $CH_2CH_2$].—A mixture of 117.2 g. (1.0 mole) of indole in 200 ml. of benzene and 1 g. of powdered potassium hydroxide was treated with 70 ml. of acrylonitrile added dropwise. The mixture was stirred for two hours, washed with water, and the organic layer dried and the solvent removed in vacuo. The residual oil was distilled in vacuo giving 143.9 g. of beta-(1-indolyl)propionitrile, B.P. 151–158° C./0.07–0.09 mm.

The beta-(1-indolyl)propionitrile was dissolved in 1200 ml. of ethanol, and ammonia gas was passed through the solution until 60 g. had been taken up. A small amount of Raney nickel was added, and the mixture was reduced under 540 p.s.i. of hydrogen at a temperature of about 75° C. When reduction was complete, the catalyst was removed and the filtrate concentrated in vacuo. The residual oil was distilled in vacuo giving 84.3 g. of 3-(1-indolyl)-propylamine, B.P. 125–128° C./0.09 mm.

The 3-(1-indolyl)propylamine (5.8 g., 0.033 mole) was heated with 4.2 g. (0.033 mole) of cis 1,2-cyclobutane dicarboxylic anhydride at a temperature of about 150° C. for three hours. There was thus obtained 9.5 g. of 3-[3-(1 - indolyl)propyl]-3-azabicyclo[3.2.0]heptane-2,4-dione as a tan glass.

*Example 30*

3 - [3 - (1 - indolyl)propyl] - 1,8,8-trimethyl-3-azabicyclo[3.2.1]octane-2,4-dione [VIc; Y is $CH_2CH_2$] was prepared from 17.4 g. (0.1 mole) of 3-(1-indolyl)propylamine and 18.2 g. (0.1 mole) of camphoric anhydride following the manipulative procedure described above in Example 25. There was thus obtained 34.8 g. of 3-[3-(1-indolyl)propyl] - 1,8,8-trimethyl-3-azabicyclo[3.2.1]octane-2,4-dione which was used directly without further purification.

*Example 31*

3 - [6 - (1 - indolyl) - 3,5 - dimethylhexyl]-3-azabicyclo[3.2.0]heptane-2,4-dione [VIc; Y is $$CH(CH_3)CH_2CH(CH_3)CH_2CH_2]$$

By reacting alpha-methylacrylonitrile with indole in the presence of base according to the manipulative procedure described above in Example 29, there can be obtained alpha-methyl-beta-(1-indolyl)propionitrile. By hydrolyzing the latter in aqueous alkali, there can be obtained alpha-methyl-beta-(1-indolyl)propionic acid. By reducing the latter with an alkali metal aluminum hydride in an organic solvent inert under the conditions of the reaction, for example diethyl ether, there can be obtained 3-(1-indolyl)-2-methylpropanol. By reacting the latter with a phosphorous trihalide, there can be obtained a 3-(1-indolyl)-2-methylpropyl halide. By reacting the latter with diethyl alpha-methylmalonate and saponifying and decarboxylating the product produced thereby according to the manipulative procedure described above in Example 2, there can be obtained delta-(1-indolyl)-alpha, gamma-dimethyl-valeric acid. By reducing the latter with an alkali metal aluminum hydride in an organic solvent inert under the conditions of the reaction, for example diethyl ether, there can be obtained 5-(1-indolyl)-2,4-dimethylpentanol. By reacting the latter with a phosphorous trihalide, there can be obtained a 5-(1-indolyl)-2,4-dimethylphentyl halide. By reacting the latter with an alkali metal cyanide in an organic solvent inert under the conditions of the reaction, for example ethanol, there can be obtained epsilon-(1-indolyl)-beta,delta-dimethylcapronitrile. By reducing the latter with hydrogen over a catalyst, for example Raney nickel, there can be obtained 6-(1-indolyl)-3,5-dimethylhexylamine. By reacting the latter with cis 1,2-cyclobutanedecarboxylic anhydride, according to the manipulative procedure described above in Example 25, there can be obtained 3-[6-(1-indolyl)-3,5-dimethylhexyl]-3-azabicyclo[3.2.0.]heptane-2,4-dione.

PREPARATION OF FINAL PRODUCTS

*Example 32*

1 - [3 - (3 - indolyl)propyl]azacycloheptane hydrochloride [Ia; Y is $CH_2CH_2$].—A solution of 16.5 g. (0.61 mole) of the 1-[beta-(3-indolyl)propionyl]azacycloheptane prepared above in Example 1 in tetrahydrofuran was treated with 3.0 g. of lithium aluminum hydride in tetrahydrofuran. The reaction mixture was heated under reflux for about four hours, cooled, diluted with ether and the excess lithium aluminum hydride decomposed by careful addition of 6 ml. of water (2 ml./gram of lithium aluminum hydride). The mixture was filtered, and the filtrate was dried and taken to dryness in vacuo. The residual yellow syrup was distilled in vacuo and the product boiling at 160–163° C. was collected. The base was converted to its hydrochloride giving 1-[3-(3-indolyl)propyl]azacycloheptane hydrochloride, M.P. 194.0–196.2° C.

*Analysis.*—Calcd. for $C_{17}H_{24}N_2 \cdot HCl$: N, 9.57; Cl, 12.11. Found: N, 9.46; Cl, 11.81.

The minimum effective hypotensive dose of 1-[3-(3-indolyl)propyl]azacycloheptane hydrochloride given subcutaneously or orally in the renal hypertensive rat was found to be 0.005 mg./kg.

1-[3-(3-indolyl)propyl]azacycloheptane hydrochloride was found to be fungicidally effective at a dilution of about 1:1,000 vs. *T. mentagrophytes* and *As. niger*.

1-[3-(3-indolyl)propyl]azacycloheptane hydrochloride has also been found to possess monoamine oxidase inhibitory activity.

Intravenous toxicity studies in mice have shown the $LD_{50}$ of 1-[3-(3-idolyl)propyl]azacycloheptane hydrochloride to be 22±1.5 mg./kg. where $LD_{50}$ is defined as the dose fatal to fifty percent of the animals at that dose level.

1-[3-(3-indolyl)propyl]azacycloheptane reacts with formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic, phenylstibnic acid, phenylphosphinous acid, methylphosphonic acid, phenylphosphinic acid, Amberlite® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like, to give, respectively, the formate, acetate, isobutyrate, alpha-mercaptopropionate, malate (or acid malate), fumarate (or acid fumarate), succinate (or acid succinate), succinamate, tartrate (or bitartrate), citrate (or acid citrate), lactate, benzoate, 4-methoxybenzoate, phthalate (or acid phthalate), anthranilate, 1-naphthalenecarboxylate, cinnamate, cyclohexane-carboxylate, mandelate, tropate, crotonate, acetylene dicarboxylate, sorbate (or acid sorbate), 2-furancarboxylate, cholate, pyrenecarboxylate, 2 - pyridinecarboxylate, 3 - indoleacetate, quinate, sulfamate, methanesulfonate, isethionate, benzenesulfonate, p-toluenesulfonate, benzenesulfinate, butylarsonate, diethylphosphinate, p-aminophenylarsinate, phenylstibnate, phenylphosphinite, methylphosphonate, Amberlite® XE–66 resin salt, hydrofluoride, hydrochloride, hydrobromide, hydriodide, perchlorate, nitrate, sulfate (or bisulfate), phosphate (or acid phosphate), hydrocyanide, phosphotungstate, molybdate, phosphomolybdate, pyrophosphate, arsenate, picrate, picrolonate, barbiturate and boron trifluoride salts.

1-[3-(3-indolyl)propyl]azacycloheptane can be reacted with hydriodic acid to form 1-[3-(3-indolyl)propyl]azacycloheptane hydriodide, useful as a characterizing intermediate.

1-[3-(3-indolyl)propyl]azacycloheptane in the form of its hydriodide salt can be converted to the hydrochloride salt by passing an aqueous solution of the former over an ion-exchange resin saturated with chloride ions, for example, Rhom & Haas' Amberlite® IRA–400 resin.

1-[3-(3-indolyl)propyl]azacycloheptane can be converted to its hydriodide salt and the latter recrystallized for purification purposes from an appropriate organic solvent. On suspension of the hydriodide in dilute aqueous sodium hydroxide, extraction of the suspension with chloroform, and removal of the chloroform from the extracts, 1-[3-(3-indolyl)propyl]azacycloheptane can be recovered in purified free base form.

*Example 33*

*1-[4-(3 - indolyl)butyl]azacycloheptane hydrochloride* [Ia; Y is $(CH_2)_3$] was prepared from 4.7 g. (0.016 mole) of the 1-[gamma-(3-indolyl)butyryl]azacycloheptane prepared above in Example 2 using the manipulative procedure described above in Example 32. The product was isolated in the form of its hydrochloride salt and recrystallized from ethanol giving 2.4 g. of 1-[4-(3-indolyl)butyl]azacycloheptane hydrochloride, M.P. 177.2–178.6° C. (corr.).

*Analysis.*—Calcd. for $C_{18}H_{26}N_2 \cdot HCl$: Cl, 11.55; N, 9.13. Found: Cl, 11.41; N, 9.02.

The minimum effective hypotensive dose of 1-[4-(3-indolyl)butyl]azacycloheptane hydrochloride given subcutaneously in the renal hypertensive rat was found to be 0.005 mg./kg.

Intravenous toxicity studies in mice have shown the $LD_{50}$ of 1-[4-(3-indolyl)butyl]azacycloheptane hydrochloride to be 23.5±2.0 mg./kg.

*Example 34*

*1-[5-(3 - indolyl)pentyl]azacycloheptane hydrochloride* [Ia; Y is, $(CH_2)_4$] was prepared from 6.0 g. (0.021 mole) of the 1-[delta-(3-indolyl)valeryl]azacycloheptane prepared above in Example 3 using the manipulative procedure described above in Example 32. The product was isolated in the form of its hydrochloride salt and recrystallized from ethanol giving 3.8 g. of 1-[5-(3-indolyl)pentyl]azacycloheptane hydrochloride, M.P. 159.8–163.8° C. (corr.).

*Analysis.*—Calcd. for $C_{19}H_{28}N_2 \cdot HCl$: Cl, 11.05; N, 8.73. Found: Cl, 11.30; N, 8.60.

The minimum effective hypotensive dose of 1-[5-(3-indolyl)pentyl]azacycloheptane hydrochloride given subcutaneously in the renal hypertensive rat was found to be 0.0025 mg./kg.

Intravenous toxicity studies in mice have shown the $ALD_{50}$ of 1-[5-(3-indolyl)pentyl]azacycloheptane hydrochloride to be 19 mg./kg.

*Example 35*

*1-[3-(3-indolyl)propyl]azacyclooctane hydrochloride* [Ia; Y is $CH_2CH_2$] was prepared from 8.5 g. (0.03 mole) of the 1-[beta-(3-indolyl)propionyl]azacyclooctane prepared above in Example 4 using the manipulative procedure described above in Example 32. The product was isolated in the form of its hydrochloride salt and recrystallized from ethanol giving 4.4 g. of 1-[3-(3-indolyl)propyl]azacyclooctane hydrochloride, M.P. 195.2–197.4° C. (corr.).

*Analysis.*—Calcd. for $C_{18}H_{26}N_2 \cdot HCl$: Cl, 11.55; N, 9.13. Found: Cl, 11.59; N, 9.12.

The minimum effective hypotensive dose of 1-[3-(3-indolyl)propyl]azacyclooctane hydrochloride given subcutaneously in the renal hypertensive rat has been found to be 0.01 mg./kg.

Toxicity studies in mice have shown the intravenous $LD_{50}$ of 1-[3-(3-indolyl)propyl]azacyclooctane hydrochloride to be 24±2 mg./kg. and the oral $LD_{50}$ to be 360±67 mg./kg.

*Example 36*

*1-[3-(3-indolyl)propyl]azacyclononane hydrochloride* [Ia; Y is $CH_2CH_2$] was prepared from 6.6 g. (0.022 mole) of the 1-[beta-(3-indolyl)propionyl]azacyclononane prepared above in Example 5 using the manipulative procedure described above in Example 32. The product was isolated in the form of its hydrochloride salt and recrystallized from methanol giving 4.1 g. of 1-[3-(3-indolyl)propyl]azacyclononane hydrochloride, M.P. 191.0–203.4° C. (corr.).

*Analysis.*—Calcd. for $C_{19}H_{28}N_2 \cdot HCl$: Cl, 11.05; N, 8.73. Found: Cl, 11.20; N, 8.57.

The minimum effective hypotensive dose of 1-[3-(3-indolyl)propyl]azacyclononane hydrochloride given subcutaneously in the renal hypertensive rat was found to be 0.005 mg./kg.

Intravenous toxicity studies in mice have shown the $ALD_{50}$ of 1-[3(3-indolyl)propyl]azacyclononane hydrochloride to be 44 mg./kg.

*Example 37*

*1-[3-(3-indolyl)propyl]-4 - phenylazacycloheptane hydrochloride* [Ia;Y is $CH_2CH_2$] was prepared from 10.2 g. (0.03 mole) of the 1-[beta-(3-indolyl)propionyl]-4-phenylazacycloheptane prepared above in Example 6 using the manipulative procedure described above in Example 32. The product was isolated in the form of its hydrochloride salt and recrystallized from a methanol-water mixture giving 3.1 g. of 1-[3-(3-indolyl)propyl]-4-phenylazacycloheptane hydrochloride, M.P. 225.4–227.8° C. (corr.).

*Analysis.*—Calcd. for $C_{23}H_{28}N_2 \cdot HCl$: N, 7.60; Cl, 9.61. Found: N, 7.58; Cl, 9.58.

The minimum effective hypotensive dose of 1-[3-(3-indolyl)propyl]-4-phenylazacycloheptane hydrochloride given subcutaneously in the renal hypertensive rat was found to be 0.1 mg./kg.

Intravenous toxicity studies in mice have shown the $ALD_{50}$ of 1-[3-3(-indolyl)propyl]-4-phenylazacycloheptane hydrochloride to be 28 mg./kg.

*Example 38*

*3-[3-(3-indolyl) - 2 - methylpropyl]-3-azabicyclo[3.2.0] heptane* [Ia;Y is $CH(CH_3)CH_2$].—By reducing the 3-[beta-(3-indolyl)-alpha - methylpropionyl]-3-azabicyclo [3.2.0]heptane obtained above in Example 7 with lithium aluminum hydride according to the manipulative procedure described above in Example 32, there can be obtained 3 - [3-(3-indolyl)-2-methylpropyl]-3-azabicyclo-[3.2.0]heptane.

Example 39

3-[4-(3-indolyl)-3-methylbutyl] - 1,8,8 - trimethyl-3-azabicyclo[3.2.1]octane [Ia; Y is $CH(CH_3)CH_2CH_2$].—By reducing the 3 - [gamma-(3-indolyl)-beta-methylbutyryl]-1,8,8-trimethyl-3-azabicyclo[3.2.1]octane prepared above in Example 8 with lithium aluminum hydride according to the manipulative procedure described in Example 32, there can be obtained 3-[4-(3-indolyl)-3-methylbutyl]-1,8,8-trimethyl-3-azabicyclo[3.2.1]octane.

Example 40

1-[3-(3-indolyl)-2-ethylpropyl]azacycloheptane [Ia; Y is $CH(C_2H_5)CH_2$].—By reducing the 1-[beta-(3-indolyl) - alpha - ethylpropionyl] - azacycloheptane obtained above in Example 9 with lithium aluminum hydride according to the manipulative procedure described above in Example 32, there can be obtained 1-[3-(3-indolyl)-2-ethylpropyl]azacycloheptane.

Example 41

1-[5-(3-indolyl)-2-methylpentyl]azacycloheptane [Ia; Y is $CH_2CH_2CH(CH_3)CH_2$].—By reducing the 1-[delta-(3-indolyl) - alpha - methylvaleryl]azacycloheptane obtained above in Example 10 with lithium aluminum hydride according to the manipulative procedure described above in Example 32, there can be obtained 1-[5-(3-indolyl)-2-methylpentyl]azacycloheptane.

Example 42

1-[5-(3-indolyl)-2,4 - dimethylpentyl]azacycloheptane [Ia; Y is $CH(CH_3)CH_2CH(CH_3)CH_2$].—By reducing the 1-[delta-(3-indolyl)-alpha,gamma - dimethylvaleryl]azacycloheptane obtained above in Example 11 with lithium aluminum hydride according to the manipulative procedure described above in Example 32, there can be obtained 1-[5-(3-indolyl)-2,4-dimethylpentyl]azacycloheptane.

Example 43

1-[6-(3 - indolyl)hexyl]azacycloheptane hydrochloride [Ia; Y is $(CH_2)_5$] was prepared from 2.1 g. (0.007 mole) of the 1-[epsilon-(3-indolyl)-epsilon-ketocaproyl]azacycloheptane prepared above in Example 12 using the manipulative procedure described above in Example 32. The product was isolated in the form of its hydrochloride salt and recrystallized from ethanol giving 1.3 g. of 1-[6-(3-indolyl)hexyl]azacycloheptane hydrochloride, M.P. 146.2–147.6° C.

Analysis.—Calcd. for $C_{20}H_{30}N_2 \cdot$ CHl: Cl. 10.59; N. 8.37. Found: Cl 10.90; N, 8.31.

The minimum effective hypotensive dose of 1-[6-(3-indolyl)hexyl]azacycloheptane hydrochloride given subcutaneously in the renal hypertensive rat was found to be 0.1 mg./kg.

Intravenous toxicity studies in mice have shown the $ALD_{50}$ of 1-[6-(3-indolyl)hexyl]azacycloheptane hydrochloride to be 28 mg./kg.

Example 44

1 - [3 - (2 - indolyl)propyl]azacycloheptane [Ib; Y is $CH_2CH_2$].—By reducing the 1 - [beta - (2 - indolyl)propionyl]azacycloheptane obtained above in Example 13 with lithium aluminum hydride according to the manipulative procedure described above in Example 32, there can be obtained 1-[3-(2-indolyl)propyl]azacycloheptane.

Example 45

1 - [4 - (2 - indolyl)butyl]azacyclooctane [Ib; Y is $(CH_2)_3$].—By reducing the 1-[gamma-(2-indolyl)butyryl]azacyclooctane obtained above in Example 14 with lithium aluminum hydride according to the manipulative procedure described above in Example 32, there can be obtained 1-[4-(2-indolyl)butyl]azacyclooctane.

Example 46

1 - [5 - (2 - indolyl)pentyl]azacyclononane [Ib; Y is $(CH_2)_4$].—By reducing the 1-[delta-(2-indolyl)valeryl]azacyclononane obtained above in Example 15 with lithium aluminum hydride according to the manipulative procedure described above in Example 32, there can be obtained 1-[5-(2-indolyl)pentyl]azacyclononane.

Example 47

1-[3-(2-indolyl)-2-methylpropyl] - 4 - phenylazacycloheptane [Ib; Y is $CH(CH_3)CH_2$].—By reducing the 1-[beta-(2-indolyl) - alpha-methylpropionyl]-4-phenylazacycloheptane obtained above in Example 16 with lithium aluminum hydride according to the manipulative procedure described above in Example 32, there can be obtained 1 - [3-(2-indolyl)-2-methylpropyl]-4-phenylazacycloheptane.

Example 48

3 - [4-(2-indolyl)-3-methylbutyl]-3-azabicyclo[3.2.0]-heptane [Ib; Y is $CH(CH_3)CH_2CH_2$].—By reducing the 3 - [gamma-(2-indolyl)-beta-methylbutyryl]-3-azabicyclo-[3.2.0]heptane obtained above in Example 17 with lithium aluminum hydride according to the manipulative procedure described above in Example 32, there can be obtained 3 - [4-(2-indolyl) - 3 - methylbutyl]-3-azabicyclo-[3.2.0]heptane.

Example 49

3 - [3-(2-indolyl)-2-ethylpropyl]-1,8,8-trimethyl-3-azabicyclo-[3.2.1]octane [Ib; Y is $CHCH_2H_5)CH_2$].—By reducing the 3-[beta - (2 - indolyl)-alpha-ethylpropionyl]-1,8,8-trimethyl-3-azabicyclo[3.2.1]octane obtained above in Example 18 with lithium aluminum hydride according to the manipulative procedure described above in Example 32, there can be obtained 3-[3-(2-indolyl)-2-ethylpropyl]-1,8,8-trimethyl-3-azabicyclo-[3.2.1]octane.

Example 50

1 - [5-(2-indolyl)-2-methylpentyl]azacycloheptane [Ib; Y is $CH_2CH_2CH(CH_3)CH_2$].—By reducing the 1-[delta-(2-indolyl)-alpha-methylvaleryl]azacycloheptane obtained above in Example 19 with lithium aluminum hydride according to the manipulative procedure described above in Example 32, there can be obtained 1-[5-(2-indolyl)-2-methylpentyl]azacycloheptane.

Example 51

1 - [5-(2-indolyl)-2,4-dimethylpentyl]azacycloheptane [Ib; Y is $CH(CH_3)CH_2CH(CH_3)CH_2$].—By reducing the 1 - [delta-(2-indolyl)-alpha,gamma-dimethylvaleryl]azacycloheptane obtained above in Example 20 with lithium aluminum hydride according to the manipulative procedure described above in Example 32, there can be obtained 1 - [5-(2-indolyl)-2,4-dimethylpentyl]azacycloheptane.

Example 52

1-[3-(1-indolyl)propyl]azacycloheptane hydrochloride [Ic; Y is $CH_2CH_2$] was prepared from 24 g. (0.089 mole) of the 1-[beta-(1-indolyl)propionyl]azacycloheptane prepared above in Example 21 using the manipulative procedure described above in Example 32. The product was isolated in the form of its hydrochloride salt and recrystallized from isopropanol giving 5.5 g. of 1-[3-(1-indolyl)-propyl]azacycloheptane hydrochloride, M.P. 154.8–157.6° C. (corr.).

Analysis.—Calcd. for $C_{17}H_{24}N_2 \cdot$ HCl: N, 9.57; Cl, 12.11. Found: N, 9.47; Cl, 12.02.

The minimum effective hypotensive dose of 1-[3-(1-indolyl)propyl]azacycloheptane hydrochloride given subcutaneously in the renal hypertensive rat was found to be 0.0025 mg./kg.

Toxicity studies in mice have shown the intravenous $LD_{50}$ of 1-[3-(1-indolyl)propyl]azacycloheptane hydrochloride to be 23.5±0.76 mg./kg. and the oral $LD_{50}$ to be 1140±97 mg./kg.

The Threshold Anesthetic Concentration$_5$ (TAC$_5$) of 1-[3-(1-indolyl)propyl]azacycloheptane hydrochloride was found to be 0.068 percent.

The effective dose, ED$_{50}$, of 1-[3-(1-indolyl)propyl]-azacycloheptane hydrochloride in inducing sleep in mice to which 40 mg./kg. of hexobarbital was administered was found to be 88±17.3 mg./kg.

1-[3-(1-indolyl)propyl]azacycloheptane has also been found to possess monoamine oxidase inhibitory activity.

*Example 53*

1 - [3-(1-indolyl)propyl]azacyclooctane hydrochloride [Ic; Y is CH$_2$CH$_2$] was prepared from 12.2 g. (0.043 mole) of the 1-[beta-(1-indolyl)propionyl]azacyclooctane prepared above in Example 22 using the manipulative procedure described above in Example 32. The product was isolated in the form of its hydrochloride salt and recrystallized from an ethyl acetate-ethanol mixture giving 3.3 g. of 1-[3-(1-indolyl)propyl]azacyclooctane hydrochloride, M.P. 142.6–153.6° C. (corr.).

*Analysis.*—Calcd. for C$_{18}$H$_{26}$N$_2$.HCl: Cl, 11.55; N, 9.13. Found: Cl, 11.54; N, 8.99.

The minimum effective hypotensive dose of 1-[3-(1-indolyl)propyl]azacyclooctane hydrochloride given subcutaneously in the renal hypertensive rat was found to be 1.0 mg./kg.

Intravenous toxicity studies in mice have shown the ALD$_{50}$ of the 1-[3-(1-indolyl)propyl]azacyclooctane hydrochloride to be 30 mg./kg.

*Example 54*

1 - [3-(1-indolyl)propyl]azacyclononane hydrochloride [Ic; Y is CH$_2$CH$_2$] was prepared from 7.5 g. (0.025 mole) of the 1-[beta-(1-indolyl)propionyl]azacyclononane prepared above in Example 23, using the manipulative procedure described above in Example 32. The product was isolated in the form of its hydrochloride salt and recrystallized from isopropanol giving 3.2 g. of 1-[3-(1-indolyl)propyl]azacyclononane hydrochloride, M.P. 180.0–181.4° C.

*Analysis.*—Calcd. for C$_{19}$H$_{28}$N$_2$.HCl: Cl, 11.05; N, 8.73. Found: Cl, 11.03; N, 8.67.

The minimum effective hypotensive dose of 1-[3-(1-indolyl)propyl]azacyclononane hydrochloride given subcutaneously in the renal hypertensive rat was found to be 0.01 mg./kg.

Intravenous toxicity studies in mice have shown the ALD$_{50}$ of 1-[3-(1-indolyl)propyl]azacyclononane hydrochloride to be 44 mg./kg.

*Example 55*

1-[3-(1-indolyl)propyl]-4-phenylazacycloheptane hydrochloride [Ic; Y is CH$_2$CH$_2$] was prepared from 7.4 g. (0.021 mole) of the 1-[beta-(1-indolyl)propionyl]-4-phenylazacycloheptane prepared above in Example 24 using the manipulative procedure described above in Example 32. The product was isolated in the form of its hydrochloride salt and recrystallized from an isopropanol-ether mixture giving 0.6 g. of 1-[3-(1-indolyl)propyl]-4-phenyllazacycloheptane hydrochloride, M.P. 154.2–159.4° C. (corr.).

*Analysis.*—Calcd. for C$_{23}$H$_{28}$N$_2$.RCl: N, 7.60; Cl, 9.61. Found: N, 7.42; Cl, 9.78.

The minimum effective hypotensive dose of 1-[3-(1-indolyl)propyl] - 4-phenylazacycloheptane hydrochloride given subcutaneously in the renal hypertensive rat was found to be 0.0025 mg./kg.

Toxicity studies in mice have shown the intravenous LD$_{50}$ of the 1-[3-(1-indolyl)propyl]-4-phenylazacycloheptane hydrochloride to be 20±1 mg./kg. and the oral LD$_{50}$ to be 1440±62 mg./kg.

*Example 56*

3-[4-(1-indolyl)butyl]-3-azabicyclo[3.2.0]heptane [Ic; Y is (CH$_2$)$_3$].—By reacting indole with a molar equivalent amount of an N-(4-halobutyl)phthalimide in the presence of an acid-acceptor, for example potassium carbonate, in an organic solvent inert under the conditions of the reaction, for example benzene or toluene, there can be obtained N-[4-(1-indolyl)butyl]phthalimide. By reacting the latter with hydrazine hydrate in ethylene glycol at a temperature around 150° C., there can be obtained 4-(1-indolyl)butylamine. By reacting the latter with cis 1,2-cyclobutane dicarboxylic anhydride following the manipulative procedure described above in Example 25, there can be obtained 3-[4-(1-indolyl)butyl]-3-azabicyclo-[3.2.0]heptane-2,4-dione. By reducing the latter with lithium aluminum hydride according to the manipulative procedure described above in Example 32, there can be obtained 3 - [4-(1-indolyl)butyl]-3-azabicyclo[3.2.0]heptane.

*Example 57*

3 - [5 - (1-indolyl)pentyl]-1,8,8-trimethyl-3-azabicyclo-[3.2.1]octane [Ic; Y is (CH$_2$)$_4$]. By following the manipulative procedure described above in Example 56, substituting for the N-(4-halobutyl)phthalimide and the cis 1,2-cyclobutane dicarboxylic anhydride used therein molar equivalent amounts of an N-(5-halopentyl)phthalimide and d,l-camphoric anhydride, respectively, there can be obtained 3-[5-1-(indolyl)pentyl]-1,8,8,-trimethyl-3-azabicyclo[3.2.1]octane.

*Example 58*

1 - [3-(1-indolyl)-2-methylpropyl]azacycloheptane [Ic; Y is CH(CH$_3$)CH$_2$].—By reacting indole with a molar equivalent amount of a 1-(3-halo-2-methylpropyl)azacycloheptane in the presence of an acid-acceptor, for example potassium carbonate, in an organic solvent inert under the conditions of the reaction, for example benzene or toluene, there can be obtained 1-[3-(1-indolyl)-2-methylpropyl]-azacycloheptane.

*Example 59*

1-[4-(1-indolyl)-3-methylbutyl[azacycloheptane [Ic; Y is CH(CH$_3$)CH$_2$CH$_2$].—By following the manipulative procedure described above in Example 58, substituting for the 1-(3-halo-2-methylpropyl)azacycloheptane used therein a molar equivalent amount of a 1-(4-halo-3-ethylbutyl)azacycloheptane, there can be obtained 1[-4-(1-indolyl)-3-methylbutyl]azacycloheptane.

*Example 60*

1-[3-(1-indolyl)-2-ethylpropyl]azacycloheptane [Ic; Y is CH(C$_2$H$_5$)CH$_2$].—By following the manipulative procedure described above in Example 58, substituting for the 1-(3-halo-2-methylpropyl)azacycloheptane used therein a molar equivalent amount of a 1-(3-halo-2-ethylpropyl)azacycloheptane, there can be obtained 1-[3-(1-indolyl)-2-ethylpropyl]azacycloheptane.

*Example 61*

1 - [5-(1-indolyl)-2-methylpentyl]azacycloheptane [Ic; Y is CH$_2$CH$_2$CH(CH$_3$)CH$_2$].—By following the manipulative procedure described above in Example 58, substituting for the 1-(3-halo-2-methylpropyl)azacycloheptane used therein a molar equivalent amount of a 1-(5-halo-2-methylpentyl)azacycloheptane, there can be obtained 1-[51(1-indolyl)-2-methylpentyl[azacycloheptane.

*Example 62*

1 - [5-(1-indolyl)-2,4-dimethylpentyl]azacycloheptane [Ic; Y is CH(CH$_3$)CH$_2$CH(CH$_3$)CH$_2$].—By following the manipulative procedure described above in Example 58, substituting for the 1-(3-halo-2-methyl propyl)azacycloheptane used therein a molar equivalent amount of a 1 - (5-halo-2,4-dimethylpentyl)azacycloheptane, there can be obtained 1-[5-(1-indolyl)-2,4-dimethylpentyl]azacycloheptane.

*Example 63*

3-[3-(3-indolyl)-1-methylpropyl]-3-azabicyclo[3.2.0]-heptane hydrochloride [Ia; Y is CH$_2$CH(CH$_3$)] was prepared from the 3-[3-(3-indolyl)-1-methylpropyl]-3-azabicyclo[3.2.0]heptane-2,4-dione prepared above in Example 25 using the manipulative procedure described above in Example 32. The product was isolated in the form of its hydrochloride salt and recrystallized from isopropanol giving 3.7 g. of 3-[3-(3-indolyl)-1-methylpropyl]-3-azabicyclo[3.2.0]heptane hydrochloride, M.P. 192.8–194.4° C. (corr.).

Analysis.—Calcd. for $C_{18}H_{24}N_2 \cdot HCl$: N, 9.19; Cl, 11.63. Found: N, 9.06; Cl, 11.52.

The minimum effective hypotensive dose of 3-[-3(3-indolyl)-1-methylpropyl]-3-azabicyclo[3.2.0]heptane hydrochloride given subcutaneously in the renal hypertensive rat was found to be 0.10 mg./kg.

Intravenous toxicity studies in mice have shown the $ALD_{50}$ of 3-[3-(3-indolyl)-1-methylpropyl]-3-azabicyclo[3.2.0]heptane hydrochloride to be 22 mg./kg.

The effective dose, $ED_{50}$, of 3-[3-(3-indolyl)-1-methylpropyl]-3-azabicyclo[3.2.0]heptane hydrochloride in inducing sleep in mice to which 40 mg./kg. of hexobarbital was administered was found to be 57±13.5 mg./kg. intraperitoneally.

Example 64

3 - [6 - (3-indolyl)hexyl]-1,8,8-trimethyl-3-azabicyclo[3.2.1]octane [Ia; Y is $(CH_2)_5$].—By reducing the 3-[6-(3 - indolyl)hexyl] - 1,8,8-trimethyl-3-azabicyclo[3.2.1]-octane-2,4-dione obtained above in Example 26 with lithium aluminum hydride according to the manipulative procedure described above in Example 32, there can be obtained 3 - [6-(3-indolyl)hexyl]-1,8,8-trimethyl-3-azabicyclo[3.2.1]octane.

Example 65

3 - [3 - (2-indolyl) - 2 - methylpropyl]-3-azabicyclo[3.2.0]heptane [Ib; Y is $CH(CH_3)CH_2$].—by reducing the 3-[3-(2-indolyl) - 2 - methylpropyl] - 3 - azabicyclo[3.2.0]heptane-2,4-dione obtained above in Example 27 with lithium aluminum hydride according to the manipulative procedure described above in Example 32, there can be obtained 3 - [3 - (2 - indolyl) - 2 - methylpropyl]-3-azabicyclo-[3.2.0]heptane.

Example 66

3 - [6 - (2 - indolyl)hexyl]1,8,8 - trimethyl - 3 - azabicyclo[3.2.1]octane [Ib; Y is $(CH_2)_5$].—By reducing the 3 - [6 - (2 - indolyl)hexyl] - 1,8,8 - trimethyl - 3-azabicyclo[3.2.1]octane-2,4-dione obtained above in Example 28 with lithium aluminum hydride according to the manipulative procedure described above in Example 32, there can be obtained 3 - [6-(2-indolyl)hexyl] - 1,8,8-trimethyl-3-azabicyclo[3.2.1]octane.

Example 67

3 - [3 - (1 - indolyl)propyl] - 3 - azabicyclo[3.2.0]heptane hydrochloride [Ic; Y is $CH_2CH_2$] was prepared from 9.4 g. (0.033 mole) of the 3-[3-(1-indolyl)propyl]-3-azabicyclo [3.2.0]heptane - 2,4-dione prepared above in Example 29, using the manipulative procedure described above in Example 32. The product was isolated in the form of its hydrochloride salt and recrystallized from isopropanol giving 6.5 g. of 3-[3-(1-indolyl)propyl]-3-azabicyclo[3.2.0]-heptane hydrochloride, M.P. 182.0–183.0° C. (corr.).

Analysis. — Calcd. for $C_{17}H_{22}N_2 \cdot HCl$: N, 9.64; Cl, 12.19. Found: N, 9.62; Cl, 12.24.

The minimum effective hypotensive dose of 3-[3-(1-indolyl)propyl] - 3 - azabicyclo[3.2.0]heptane hydrochloride given subcutaneously in the renal hypertensive rat was found to be 0.00125 mg./kg.

Toxicity studies in mice have shown the intravenous $LD_{50}$ of 3-[3-(1-indolyl)propyl]-3-azabicyclo[3.2.0]heptane hydrochloride to be 30±2 mg./kg. and the oral $LD_{50}$ to be 515±152 mg./kg.

3-[3-(1-indolyl)propyl] - 3 - azabicyclo[3.2.0]heptane hydrochloride has also been found to possess monoamine oxidase inhibitory activity.

Example 68

3 - [3-(1-indolyl)propyl]-1,8,8-trimethyl-3-azabicyclo[3.2.1]octane hydrochloride [Ic; Y is $CH_2CH_2$] was prepared from 34.8 g. (0.1 mole) of the 3-[3-(1-indolyl)propyl]1,8,8 - trimethyl - 3 - azabicyclo - [3.2.1]octane-2,4-dione prepared above in Example 30, using the manipulative procedure described above in Example 32. The product was isolated in the form of its hydrochloride salt and recrystallized from an isopropanol-ether mixture giving 3.5 g. of 3-[3-(1-indolyl)propyl]1,8,8-trimethyl - 3 - azabicyclo[3.2.1]octane hydrochloride, M.P. 206.8–209.0° C.

Analysis.—Calcd. for $C_{21}H_{30}N_2 \cdot HCl$: N, 8.08; Cl, 10.22. Found: N, 8.06; Cl, 10.30.

The minimum effective hypotensive dose of 3-[3(1-indolyl)propyl] - 1,8,8 - trimethyl - 3 - azabicyclo[3.2.1]-octane hydrochloride given subcutaneously in the renal hypertensive rat was found to be 0.01 mg./kg.

Intravenous toxicity studies in mice have shown the $ALD_{50}$ of 3 - [3-(1-indolyl)propyl]1,8,8-trimethyl-3-azabicyclo[3.2.1]octane hydrochloride to be 60 mg./kg.

Example 69

3 - [6-(1-indolyl)3,5 - dimethylhexyl] - 3 - azabicyclo[3.2.0]heptane [Ic; Y is $$CH(CH_3)CH_2CH(CH_3)CH_2CH_2]$$

By reducing the 3 - [6-(1-indolyl)-3,5-dimethylhexyl]-3-azabicyclo[3.2.0]heptane-2,4-dione obtained above in Example 31 with lithium aluminum hydride according to the manipulative procedure described above in Example 32, there can be obtained 3-[6-(1-indolyl)-3,5-dimethylhexyl]-3-azabicyclo[3.2.0]heptane.

I claim:

1. A member of the group consisting of (A) a compound of the formula

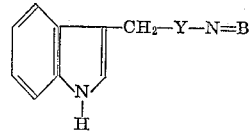

where Y represents lower alkylene of two to seven carbon atoms and interposing from two to five carbon atoms between the indolylmethyl group and the nitrogen atom of the group N=B, and N=B represents a member of the group consisting of 1-(azacycloalkanyl) of seven to nine ring atoms, 1 - (4-phenylazacycloheptanyl), 3 - (3-azabicyclo[3.2.0]heptanyl) and 3-(1,8,8-trimethyl-3-azabicyclo[3.2.1]octanyl); and (B) an acid-addition salt thereof.

2. An acid-addition salt of 1 - [3-(3-indolyl)propyl]-azacycloheptane.

3. An acid-addition salt of 1-[4-(3-indolyl)butyl]-azacycloheptane.

4. An acid-addition salt of 1 - [5-(3-indolyl)pentyl]-azacycloheptane.

5. An acid-addition salt of 1 - [3-(3-indolyl)propyl]-azacyclononane.

6. An acid-addition salt of 1 - [3-(3-indolyl)propyl]-azacyclooctane.

7. A member of the group consisting of (A) a compound of the formula

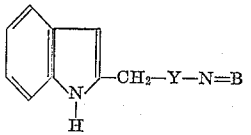

where Y represents lower-alkylene of two to seven carbon atoms and interposing from two to five carbon atoms between the indolylmethyl group and the nitrogen atom of the group N=B, and N=B represents a member of the group consisting of 1-(azacycloalkanyl) of seven to nine ring atoms, 1-(4-phenylazacycloheptanyl), 3-(3-azabicyclo[3.2.0]heptanyl) and 3 - (1,8,8-trimethyl-3-azabicyclo-[3.2.1]octanyl; and (B) an acid-addition salt thereof.

8. A member of the group consisting of (A) a compound of the formula

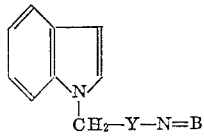

where Y represents lower-alkylene of two to seven carbon atoms and interposing from two to five carbon atoms between the indolylmethyl group and the nitrogen atom of the group N=B, and N=B represents a member of the group consisting of 1-(azacycloalkanyl) of seven to nine ring atoms, 1-(4-phenylazacycloheptanyl), 3-(3-azabicyclo[3.2.0]heptanyl) and 3-(1,8,8-trimethyl-3-azabicyclo-[3.2.1]octanyl); and (B) an acid-addition salt thereof.

9. An acid-addition salt of 1 - [3-(1-indolyl)propyl]-azacycloheptane.

10. An acid-addition salt of 1 - [3-(1-indolyl)propyl]-azacyclononane.

11. An acid-addition salt of 1 - [3-(1-indolyl)propyl]-4-phenylazacycloheptane.

12. An acid-addition salt of 3-[3-(1-indolyl)propyl]-3-azabicyclo[3.2.0]heptane.

13. An acid-addition salt of 3 - [3(1-indolyl)propyl]-1,8,8-trimethyl-3-azabicyclo[3.2.1]octane.

14. A compound of the formula

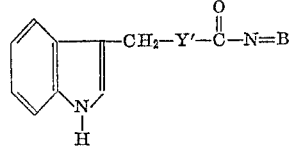

where Y' represents lower-alkylene of two to six carbon atoms and interposing from one to four carbon atoms between the indolylmethyl group and the amide carbonyl carbon atom, and N=B represents a member of the group consisting of 1-(azacycloalkanyl) of seven to nine ring atoms, 1 - (4-phenylazacycloheptanyl), 3 - (3-azabicyclo[3.2.0]heptanyl) and 3 - (1,8,8 - trimethyl - 3-azabicyclo[3.2.1]octanyl).

15. 1-[beta-(3-indolyl)propionyl]azacyclononane.

16. A compound of the formula

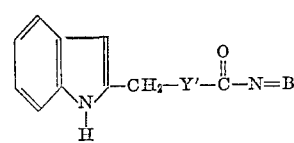

where Y' represents lower-alkylene of two to six carbon atoms and interposing from one to four carbon atoms between the indolylmethyl group and the amide carbonyl carbon atom, and N=B represents a member of the group consisting of 1-(azacycloalkanyl) of seven to nine ring atoms, 1 - (4-phenylazacycloheptanyl), 3 - (3-azabicyclo[3.2.0]heptanyl) and 3-(1,8,8-trimethyl - 3 - azabicyclo[3.2.1]octanyl).

17. A compound of the formula

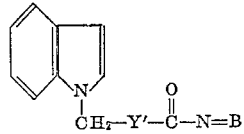

where Y' represents methylene or lower-alkylmethylene, and N=B represents a member of the group consisting of 1-(azacycloalkanyl) of seven to nine ring atoms, 1-(4-phenylazacycloheptanyl), 3 - (3-azabicyclo[3.2.0]heptanyl) and 3-(1,8,8-trimethyl-3-azabicyclo[3.2.1]octanyl).

18. 1-[beta-(1-indolyl)propionyl]azacyclononane.

19. A compound of the formula

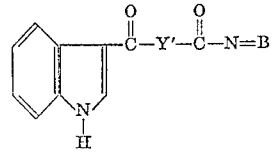

where Y' represents lower-alkylene interposing four carbon atoms between the indolyl carbonyl group and the amide carbonyl carbon atom, and N=B represents a member of the group consisting of 1-(azacycloalkanyl) of seven to nine ring atoms, 1-(4-phenylazacycloheptanyl), 3 - (3 - azabicyclo[3.2.0]heptanyl) and 3 - (1,8,8-trimethyl-3-azabicyclo[3.2.1]octanyl).

20. 1-[epsilon - (3 - indolyl)-epsilon-ketocaproyl]-azacycloheptane.

21. A compound of the formula

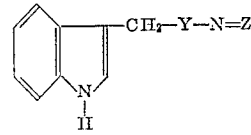

where Y represents lower-alkylene of two to seven carbon atoms and interposing from two to five carbon atoms between the indolylmethyl group and the nitrogen atom of the group N=Z, and N=Z represents a member of the group consisting of 3 - (3-azabicyclo[3.2.0]heptane - 2,4-dionyl) and 3-(1,8,8-trimethyl-3-azabicyclo[3.2.1]octane-2,4-dionyl).

22. A compound of the formula

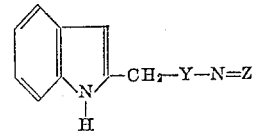

where Y represents lower-alkylene of two to seven carbon atoms and interposing from two to five carbon atoms between the indolylmethyl group and the nitrogen atom of the group N=Z, and N=Z represents a member of the group consisting of 3 - (3-azabicyclo[3.2.0]heptane-2,4-dionyl and 3-(1,8,8-trimethyl-3-azabicyclo[3.2.1]octane-2,4-dionyl).

23. A compound of the formula

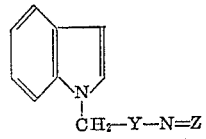

where Y represents lower-alkylene of two to seven carbon atoms and interposing from two to five carbon atoms between the indolylmethyl group and the nitrogen atom of the group N=Z, and N=Z represents a member of the group consisting of 3 - (3-azabicyclo[3.2.0]heptane-2,4-dionyl) and 3-(1,8,8-trimethyl-3-azabicyclo[3.2.1]octane-2,4-dionyl).

References Cited by the Examiner

UNITED STATES PATENTS 2,804,462   8/57   Speeter _____ 260—319

OTHER REFERENCES

Rice: J. Organic Chem., vol. 24, pages 1520–1523 (1959).

Rice et al.: J. American Chem. Soc., vol. 75, pages 4911–4915 (1953).

Rice et al.: J. Organic Chem., vol. 24, pages 7–11, January 1954.

IRVING MARCUS, *Primary Examiner.*

UNITED STATES PATENT OFFICE
CERTIFICATE OF CORRECTION

Patent No. 3,155,668                                  November 3, 1964

Noel F. Albertson

It is hereby certified that error appears in the above numbered patent requiring correction and that the said Letters Patent should read as corrected below.

Column 8, line 6, for "(3-(2-" read -- 3-(2- --; column 14, line 70, for "if" read -- of --; column 15, line 3, for "dethyl" read -- diethyl --; column 16, line 41, for "proply" read -- propyl --; lines 41 and 42, for "alpha-methlymalonate" read -- alpha-methylmalonate --; line 61, for "2-methlypropanol" read -- 2-methylpropanol --; column 17, line 6, for "0.1 mole)" read -- (0.1 mole) --; column 19, lines 22 and 23, for "3-2-indolyl)" read -- 3-(2-indolyl) --; column 23, line 21, after "methylphosphonate," insert -- phenylphosphinate, --; line 68, for "CH$_2$)$_4$" read -- (CH$_2$)$_4$ --; column 24, line 68, for "1-[3-3(" read -- 1-[3-(3 --; column 26, line 30, for "CHCH H )CH " read -- CH(C$_2$H$_5$)CH$_2$ --; column 27, line 59, for "phenyllazacycloheptane" read -- phenylazacycloheptane --; line 61, for "C$_{23}$H$_{28}$N$_2$.RCl" read -- C$_{23}$H$_{28}$N$_2$.HCl --; column 28, line 38, for "-methylbutyl[", in italics, read -- -methylbutyl] --, in italics; lines 42 and 43, for "3-ethylbutyl" read -- 3-methylbutyl --; lines 60 and 61, for "1-[5l" read -- 1-[5- --; column 31, line 4, for "octanyl;" read -- octanyl); --; column 32, line 47, "dionyl" read -- dionyl) --.

Signed and sealed this 3rd day of August 1965.

(SEAL)
Attest:

ERNEST W. SWIDER                                    EDWARD J. BRENNER
Attesting Officer                                  Commissioner of Patents